United States Patent
Kim

(10) Patent No.: US 12,489,765 B2
(45) Date of Patent: Dec. 2, 2025

(54) EMAIL SECURITY DIAGNOSIS DEVICE BASED ON QUANTITATIVE ANALYSIS OF THREAT ELEMENTS, AND OPERATION METHOD THEREOF

(71) Applicant: KIWONTECH CO., LTD., Seoul (KR)

(72) Inventor: Chung Han Kim, Seoul (KR)

(73) Assignee: KIWONTECH CO., LTD., Seoul (KR)

( * ) Notice: Subject to any disclaimer, the term of this patent is extended or adjusted under 35 U.S.C. 154(b) by 0 days.

(21) Appl. No.: 18/549,161

(22) PCT Filed: Jan. 27, 2022

(86) PCT No.: PCT/KR2022/001427
§ 371 (c)(1),
(2) Date: Sep. 5, 2023

(87) PCT Pub. No.: WO2023/145995
PCT Pub. Date: Aug. 3, 2023

(65) Prior Publication Data
US 2024/0163299 A1 May 16, 2024

(30) Foreign Application Priority Data
Jan. 27, 2022 (KR) .......... 10-2022-0011946

(51) Int. Cl.
*H04L 9/40* (2022.01)
*G06F 16/353* (2025.01)
(Continued)

(52) U.S. Cl.
CPC ........ *H04L 63/1416* (2013.01); *G06F 16/353* (2019.01); *G06F 16/9035* (2019.01);
(Continued)

(58) Field of Classification Search
CPC ...... G06F 21/566; G06F 40/40; G06F 18/232; H04L 63/0245; H04L 63/1483; H04L 63/20; H04L 67/306
See application file for complete search history.

(56) References Cited

U.S. PATENT DOCUMENTS 7,739,740 B1 * 6/2010 Nachenberg .......... G06F 21/566
713/188
2019/0132273 A1 * 5/2019 Ryan .................... H04L 63/1483
(Continued)

FOREIGN PATENT DOCUMENTS

JP 2021-528705 A 10/2021
KR 10-2004-0011863 A 2/2004
(Continued)

OTHER PUBLICATIONS

Office Action for KR10-2022-0011946 by Korean Intellectual Property Office dated Jun. 15, 2023.
(Continued)

*Primary Examiner* — Barbara B Anyan
(74) *Attorney, Agent, or Firm* — BROADVIEW IP LAW, PC

(57) ABSTRACT

A service providing device according to an embodiment of the present invention comprises: a collection unit for collecting mail information transmitted between one or more user terminals; a security threat inspection unit for performing matching of a mail security process corresponding to the mail information in stages according to a preset security threat architecture, inspecting the mail information according to the matched mail security process, and storing and managing mail security inspection information according to the inspection results; and an email security diagnosis service unit for calculating quantitative analysis information, corresponding to a threat level element classification reference of a mail system to be diagnosed, from the architecture
(Continued)

processing information from the security threat inspection unit, and creating an email security diagnosis analysis report based on the quantitative analysis information to provide the email security diagnosis analysis reporting to a user terminal of a manager.

16 Claims, 13 Drawing Sheets

(51) Int. Cl.
    *G06F 16/9035*     (2019.01)
    *G06F 18/232*     (2023.01)
    *G06F 21/56*     (2013.01)
    *G06F 40/40*     (2020.01)

(52) U.S. Cl.
    CPC .......... *G06F 18/232* (2023.01); *G06F 21/566* (2013.01); *G06F 40/40* (2020.01); *H04L 63/1425* (2013.01); *H04L 63/1483* (2013.01); *H04L 63/20* (2013.01)

(56) References Cited

U.S. PATENT DOCUMENTS

| | | | | |
|---|---|---|---|---|
| 2019/0260780 A1* | 8/2019 | Dunn | ..................... | G06F 18/232 |
| 2020/0389486 A1* | 12/2020 | Jeyakumar | ............ | G06F 16/353 |
| 2020/0396190 A1* | 12/2020 | Pickman | ................ | H04L 67/306 |
| 2020/0396258 A1* | 12/2020 | Jeyakumar | ............. | G06N 20/00 |
| 2021/0168161 A1* | 6/2021 | Dunn | ..................... | H04L 51/212 |
| 2021/0266294 A1* | 8/2021 | Chechik | ................ | H04L 63/105 |
| 2021/0272066 A1* | 9/2021 | Bratman | ............ | G06Q 10/0635 |
| 2021/0273950 A1* | 9/2021 | Lawson | .................. | H04L 63/20 |
| 2021/0273976 A1* | 9/2021 | Reiser | ................ | G06F 16/9035 |
| 2021/0336983 A1* | 10/2021 | Lee | ...................... | H04L 63/0245 |
| 2023/0308472 A1* | 9/2023 | Boyer | ..................... | G06F 40/40 |

FOREIGN PATENT DOCUMENTS

| | | |
|---|---|---|
| KR | 10-2012-0057066 A | 6/2012 |
| KR | 10-1857969 B1 | 6/2018 |
| KR | 10-2021-0017986 A | 2/2021 |
| KR | 10-2021-0083607 A | 7/2021 |

OTHER PUBLICATIONS

Office Action for KR10-2022-0011946 by Korean Intellectual Property Office dated Feb. 27, 2023.
International Search Report & Written Opinion for PCT/KR2022/001427 by Korean Intellectual Property Office dated Oct. 25, 2022.
Jung Heun, Lee (2021) "Is your email safe? Korean Information Security and Safety Union Initiates Free Consultation." Article. Hankyung Magazine. Mar. 2021.
Office Action for JP 2022-573722 by Japan Patent Office dated Feb. 27, 2024.

* cited by examiner

FIG. 3
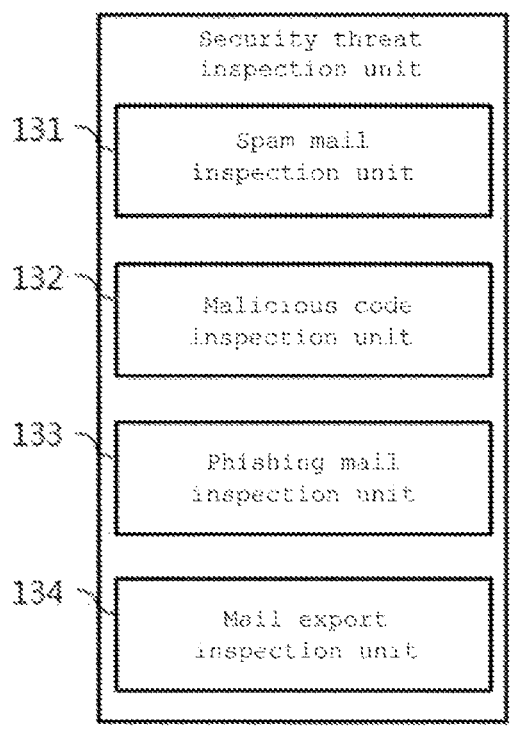
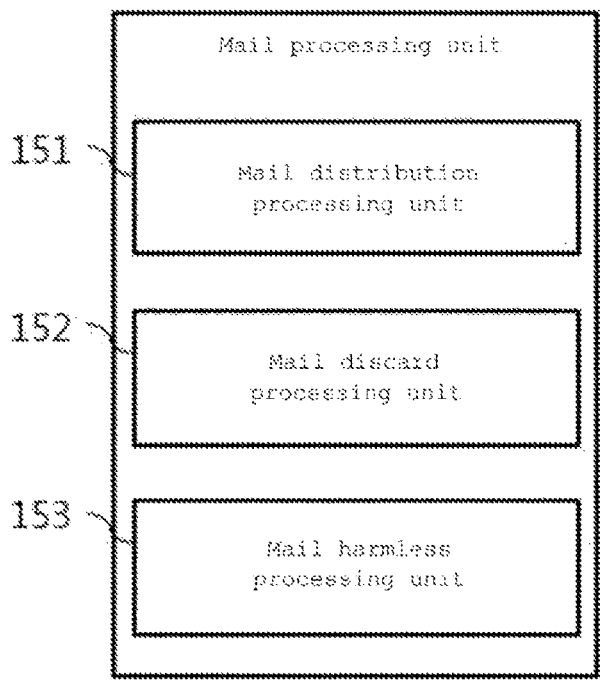
(a) (b)

FIG. 8

| Malicious code mail | | | Social engineering mail (including targeted type) | | |
|---|---|---|---|---|---|
| Malicious code | Behavior detection | _ cases | Header forgery and alteration | Change of address in reply | _ cases |
| | | _ cases | | Change of ID | _ cases |
| | Virus | _ cases | | Change of domain | _ cases |
| | | _ cases | | Change in order of ID and domain | _ cases |
| Malicious URL | URL in message body | _ cases | Similar domain | High | _ cases |
| | | | | Medium | _ cases |
| | URL in attached file | _ cases | | Low | _ cases |
| Ransomware | | _ cases | | Top Level Domain (TLD) | _ cases |

FIG. 9

| Threat levels | Threat level criteria |
|---|---|
| First level (general threat) | Ratio of reliability warning mail, Ratio of similar domain (low) |
| Second level (general threat) | Ratio of virus mail, Ratio of URL in message body, Ratio of mail with changed delivery route, Ratio of mail with similar domain (medium), Ratio of mail with changed ID, Ratio of mail with changed domain |
| Third level (slightly risky) | Ratio of mail with changed sender's country, Ratio of mail with change in order of ID and domain, Ratio of mail with similar domain (upper), Ratio of mail with changed address in reply |
| Fourth level (highly risky) | Ratio of mail with changed sender's mail server, Ratio of mail with ransomware, Ratio of mail with URL in attached file, Ratio of mail with similarity (high), and Ratio of mail with TLD |

EMAIL SECURITY DIAGNOSIS DEVICE BASED ON QUANTITATIVE ANALYSIS OF THREAT ELEMENTS, AND OPERATION METHOD THEREOF

CROSS-REFERENCE TO RELATED APPLICATIONS

This application is a National Phase Entry Application of PCT Application No. PCT/KR2022/001427 filed on Jan. 27, 2022, which claims priority to Korean Patent Application No. 10-2022-0011946 filed on Jan. 27, 2022, in Korean Intellectual Property Office, the entire contents of which are hereby incorporated by reference in its entirety.

TECHNICAL FIELD

The present invention relates to an email security diagnosis device and an operation method thereof, and more specifically, to an email security diagnosis device based on quantitative analysis of threat elements using a security level-based hierarchical architecture, and an operation method thereof, which can detect and block cyber threats such as malicious code infection, social engineering hacking, and the like through email.

BACKGROUND ART

In today's society, dependency on cyberculture is increasing in all areas of social life around the world due to advancement in computers and information and communication technologies, and this trend is further accelerated. Recently, as 5G mobile communication with ultra-high speed, ultra-low delay, and hyper-connectivity is commercialized and new services based thereon are introduced, cyber security is becoming more important.

Technical fields such as Internet of Things (IoT), cloud systems, big data, artificial intelligence (AI), and the like provide a new service environment in combination with the information and communication technologies. A system that provides such a service may be connected to a PC, a portable terminal device, or the like through an Internet network, a wireless network, or the like to be used in real life.

As the information and communication technologies connected to various terminal devices or communication devices are getting more closely related to real life in this way, cyber security threats with malicious intention using the technologies are increasing day by day. As sophisticated and advanced cyber security threats induce abnormal execution of information and communication terminal devices of organizations, institutions, or individuals or induce human errors through forgery and alteration of management information, damage such as stealing and destroying information may be generated. In addition, information illegally stolen through the cyber security threats may also be used to commit monetary fraud crimes or other economic and social crimes.

An information protection system that protects and manages systemized information and communication technologies may be used to block and respond to the cyber security threats. The information protection system may be constructed according to the system type or technical features of the information and communication technologies and applied in steps to respond to various cyber threats.

Email systems used in the information and communication technologies may provide electronic mail service including a message body to send and receive messages using communication lines between users through computer terminals. At this point, emails may attach electronic files containing contents to be shared, and a link (URL; uniform resource locator) for connecting to a website may be written in the message body or inserted in the attached file.

In this way, an executable electronic file containing malicious codes may be attached or a URL that allows connection to a specific website may be inserted through the email system with a malicious intention. Through this, as email recipients are persuaded to execute the malicious codes or access a forged or altered website through the inserted URL, processing of information not intended by the user may be performed, and information can be stolen.

In order to respond to the email security threats that may induce economic and social damage and lead to various crimes, a 'system for controlling and blocking electronic mail attached with malicious codes' is disclosed in Korean Patent Registration No. 10-1595379. The registered patent describes a system for controlling and blocking electronic mail attached with malicious codes, and the system includes: a target system having a function of receiving electronic mail sent from an external server or a terminal and received via a firewall and a spam blocking device embedded with spam blocking software, a function of confirming whether the electronic mail has an attached file, transmitting the electronic mail to a mail server when there is no attached file, and preventing infection of a malicious code by blocking the electronic mail except for the types of attached files (document, compression, image) most frequently used for user's business purposes when there is an attached file, a function of transmitting the electronic mail to the mail server when the type of the attached file is an image since it cannot be infected with a malicious code as an image cannot be converted, and transmitting a notification mail to the user terminal, when the type of the attached file is a document, by selecting one or more among the electronic mail, messenger, mobile communication, and KakaoTalk in a way of converting the document into an unmodifiable PDF form to prevent the user terminal from being infected by a malicious code when the mail recipient clicks a URL reflected with a malicious code in the document, a function of decompressing the attached file and analyzing a file type when the type of the attached file is a compressed file, processing in the method described above when the type of the attached file is an image, converting the attached file into a PDF file and processing in the method described above when the type of the attached file is a document, performing inspection and treatment of malicious code infection in a Virtual BOX equipped with various types of malicious code treatment solutions, and sending a notification mail including a result thereof to the mail server by selecting one or more among electronic mail, messenger, mobile communication, and KakaoTalk when the type of the attached file is an execution file, and a function of sending an attached file that requires malicious code inspection, other than the execution file, to the Virtual BOX to inspect and treat the malicious code, and receiving a result thereof; a virtual box for receiving an execution file from the target system, which configures a virtualized environment as a separate system and mounts various types of malicious code treatment solutions to inspect and treat malicious codes hidden in the execution file, transfer a result thereof to the target system, and process restoration to an environment before the inspection; a mail server having a function of receiving electronic mail (including notification mail) from the target system and forwarding the electronic mail (including notification mail) to the user terminal; and the user terminal having a function of selecting, when a notification mail is received from the target system, permission or rejection of the original electronic mail through confirmation of the notification mail, and a function of confirming the received electronic mail after logging in, by the user.

However, the system for controlling and blocking electronic mail attached with malicious codes is limited to a response system that is on the receiving side of email. In addition, there is a limit in responding to the cyber security threats from the aspect of the internal side of an email management system and the aspect of processing the email in the user terminal device, in addition to the aspect of the sending side of the email.

In addition, since the system is limited to PDF conversion against malicious codes and forged and altered URLs embedded in the files attached to an email, there may be limitations in diagnosing and responding to threats such as a mail disguised with a similar domain, analysis of relationship that may launch social engineering attacks, and the like.

In addition, as a fundamental problem of security threats to email systems, there is a problem of unable to prevent security risk behaviors of email system users in advance with only the behavior of controlling and blocking electronic mails. Although processes such as diagnosis, learning education, and the like using simulations, malicious code training emails, and the like are proposed recently to prevent users' risky behaviors as much as possible, there is a problem in that these are based on virtual simulations or simple surveys, and slightly different from actual situations.

Particularly, since cyber security threats actually facing are generated in real time even at the present time, required is an effective diagnosis system that can accurately diagnose security threats of the current systems on the basis of actual data of concerned persons and actually prevent users' risky behaviors.

DISCLOSURE OF INVENTION

Technical Problem

Therefore, the present invention has been made in view of the above problems, and it is an object of the present invention to provide an email security service, which can respond to cyber security threats and control and manage email systems step-by-step using a hierarchical architecture based on security levels against the cyber security threats such as spam, hacking, fraud, and the like that can be considered from the aspect of incoming mail, outgoing mail, and mail processing in a system, a user terminal device, and the like, and provide an effective email security diagnosis device based on quantitative analysis of cyber security threat elements and an operation method thereof, which can accurately diagnose security threats of the current systems on the basis of actual data of concerned persons and actually prevent users' risky behaviors by quantitively analyzing cyber security threats actually facing, using architecture processing information acquired according to the control and management.

Technical Solution

To accomplish the above object, according to one aspect of the present invention, there is provided a service providing device comprising: a collection unit for collecting mail information transmitted and received between one or more user terminals; a security threat inspection unit for processing step-by-step matching of a mail security process corresponding to the mail information, inspecting the mail information by the matching-processed mail security process, and storing and managing mail security inspection information according to a result of the inspection, on the basis of a preset security threat architecture; and an email security diagnosis service unit for calculating quantitative analysis information corresponding to the threat level element classification criteria of a mail system to be diagnosed from architecture processing information of the security threat inspection unit, and configuring and providing an email security diagnosis analysis report based on the quantitative analysis information to a user terminal of a manager.

In addition, according to another aspect of the present invention, there is provided an operation method of a service providing device, the method comprising the steps of: collecting mail information transmitted and received between one or more user terminals; processing step-by-step matching of a mail security process corresponding to the mail information, inspecting the mail information by the matching-processed mail security process, and storing and managing mail security inspection information according to a result of the inspection, on the basis of a preset security threat architecture; and calculating quantitative analysis information corresponding to the threat level element classification criteria of a mail system to be diagnosed from architecture processing information of the security threat inspection unit, and configuring and providing an email security diagnosis analysis report based on the quantitative analysis information to a user terminal of a manager.

Meanwhile, the method according to an embodiment of the present invention for solving the problems as described above may be implemented as a program for executing the method in a computer or a computer-readable recording medium in which the program is recorded.

Advantageous Effects

According to an embodiment of the present invention, as emails are analyzed by classifying threats into a spam mail, an attached file containing malicious codes, a forged and altered URL, a similar domain, and fraudulent contents from the aspect of the receiving side, and the threats can be handled step-by-step, mails sent for malicious purposes can be blocked before the recipient opens or converted into a mail harmless to the system.

In addition, damage can be prevented so that the emails may not be used for malicious purposes by detecting and blocking cyber security threats from the aspect of the sending side and detecting in advance potential threats such as being suspicious of information leakage or inconsistency of managed system access IP address information from the aspect of the internal side of an email management system. An email service that guarantees safe exchange and processing of information between users can be provided by controlling abnormal situations such as hacking, fraud, and spam that can be generated through an email system and preventing damage thereof in this way.

Furthermore, according to an embodiment of the present invention, there is provided an effective email security diagnosis device based on quantitative analysis of cyber security threat elements and an operation method thereof, which can accurately diagnose security threats of the current systems on the basis of actual data of concerned persons and actually prevent users' risky behaviors by quantitively analyzing cyber security threats actually facing, using architecture processing information acquired according to the control and management of the step-by-step threat handling process.

BRIEF DESCRIPTION OF THE DRAWINGS

FIG. 3 is a block diagram for explaining in more detail some configurations of a device for providing a mail security service according to an embodiment of the present invention.

FIGS. 8 and 9 are views showing an example of threat level ratio factors and a reference table for calculating a score of each classified threat level according to an embodiment of the present invention.

BEST MODE FOR CARRYING OUT THE INVENTION

Figure 1:
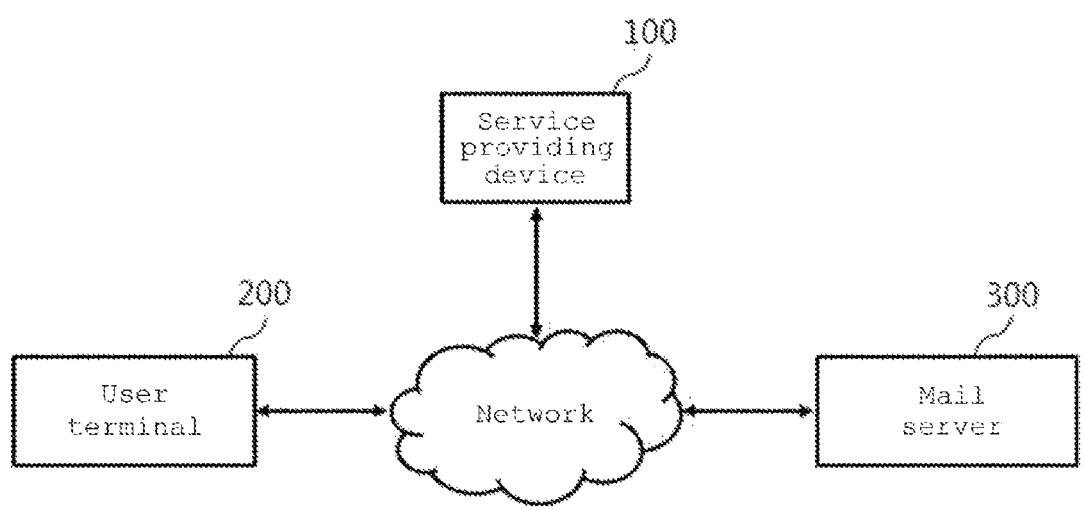
FIG. 1 is a conceptual view showing the entire system according to an embodiment of the present invention.

Hereinafter, only the principles of the present invention will be exemplified. Therefore, although not clearly described or shown in this specification, those skilled in the art will be able to implement the principles of the present invention and invent various devices included in the spirit and scope of the present invention. In addition, it should be understood that all conditional terms and embodiments listed in this specification are, in principle, clearly intended only for the purpose of understanding the concept of present invention, and not limited to the embodiments and states specially listed as such.

In addition, it should be understood that all detailed descriptions listing specific embodiments, as well as the principles, aspects, and embodiments of the present invention, are intended to include structural and functional equivalents of such matters. In addition, it should be understood that such equivalents include equivalents that will be developed in the future, as well as currently known equivalents, i.e., all devices invented to perform the same function regardless of the structure.

Accordingly, for example, the block diagrams in the specification should be understood as expressing the conceptual viewpoints of illustrative circuits that embody the principles of the present invention. Similarly, all flowcharts, state transition diagrams, pseudo code, and the like may be practically embodied on computer-readable media, and it should be understood that regardless of whether or not a computer or processor is explicitly shown, they show various processes performed by the computer or processor.

In addition, explicit use of the terms presented as processors, controls, or concepts similar thereto should not be interpreted by exclusively quoting hardware having an ability of executing software, and should be understood to implicitly include, without limitation, digital signal processor (DSP) hardware, and ROM, RAM and non-volatile memory for storing software. Other known common hardware may also be included.

The above objects, features and advantages will become more apparent through the following detailed description related to the accompanying drawings, and accordingly, those skilled in the art may easily implement the technical spirit of the present invention. In addition, when it is determined in describing the present invention that the detailed description of a known technique related to the present invention may unnecessarily obscure the gist of the present invention, the detailed description thereof will be omitted.

The terms used in this specification are used only to describe specific embodiments, and are not intended to limit the present invention. Singular expressions include plural expressions unless the context clearly dictates otherwise. It should be understood that in this specification, terms such as "comprise" or "have" are intended to specify existence of a feature, a number, a step, an operation, a component, a part, or a combination thereof described in the specification, not to preclude the possibility of existence or addition of one or more other features, numbers, steps, operations, components, parts, or combinations thereof.

Hereinafter, preferred embodiments of the present invention will be described in more detail with reference to the accompanying drawings. In describing the present invention, in order to facilitate the overall understanding, the same reference numerals are used for the same components in the drawings, and duplicate descriptions of the same components are omitted.

A 'mail (email)' used in this specification may collectively refer to terms such as electronic mail, web email, electronic mail, electronic mail materials, and the like exchanged between a user and a terminal device using a computer communication network through a client program installed in the terminal device or a website.

FIG. 1 is a conceptual view showing the entire system according to an embodiment of the present invention.

Referring to FIG. 1, a system according to an embodiment of the present invention includes a service providing device 100, a user terminal 200, and a mail server 300.

More specifically, the service providing device 100, the user terminal 200, and the mail server 300 are connected to a public network in a wired or wireless manner to transmit and receive data. The public network is a communication network constructed and managed by the country or a telecommunication infrastructure operator, and generally includes a telephone network, a data network, a CATV network, a mobile communication network, and the like, and provides connection services so that unspecified many people may access other communication networks or the Internet. In the present invention, the public network is described as a network.

In addition, the service providing device 100, the user terminal 200, and the mail server 300 may include a communication module for communicating using a protocol corresponding to each communication network.

The service providing device 100 may be connected to each user terminal 200 and the mail server 300 through a wired/wireless network to provide a mail security and diagnosis service, and devices or terminals connected to each network may communicate with each other through a preset network channel.

Here, each of the networks may be implemented as any one type of wired/wireless networks, such as a local area network (LAN), a wide area network (WAN), a value-added network (VAN), a personal area network (PAN), a mobile communication network, or a satellite communication network.

The service providing device 100 described in this specification may provide a mail security service capable of detecting and blocking unintended execution of a program through a mail and attacks that lead to lowered data processing power, phishing scam, and the like of mail-related systems.

In addition, the service providing device 100 may provide a mail diagnosis service of performing a mail diagnosis process based on quantitative analysis of mail security threat elements, and providing a diagnosis report based on the diagnosis process to each email system user terminal 200, using architecture processing information based on the security level of the mail security service.

In addition, although the user terminal 200 described in this specification may include a personal computer (PC), a laptop computer, a mobile phone, a tablet PC, a Personal Digital Assistant (PDA), a Portable Multimedia Player (PMP), and the like, the present invention is not limited thereto, and the user terminal may be a device that can be connected to the service providing device 100 and the mail server 300 through a public network or a private network.

In addition, each device may be a device of various types capable of inputting and outputting information by driving an application or browsing the web. Particularly, it is general that user terminals 200 may be connected to the service providing device 100 through an individual security network.

The mail server 300 is a system that relays and stores electronic mail contents so that a user may send a mail written through the user terminal 200 or receive a mail written by a counterpart through the user terminal 200. The mail server 300 may communicate using a pre-set protocol according to the purpose of receiving and sending mails.

Generally, Post Office Protocol 3 (POP3) and Internet Message Access Protocol (IMAP) may be used as the protocol when a mail is received. In addition, Simple Mail Transfer Protocol (SMTP) may be used as the protocol when sending a mail. In this way, the mail server 300 may be configured to operate as a server system for processing mail transmission and reception. In addition, the mail server 300 may be subdivided into a mail receiving server and a mail sending server to provide their functions.

Figure 2:
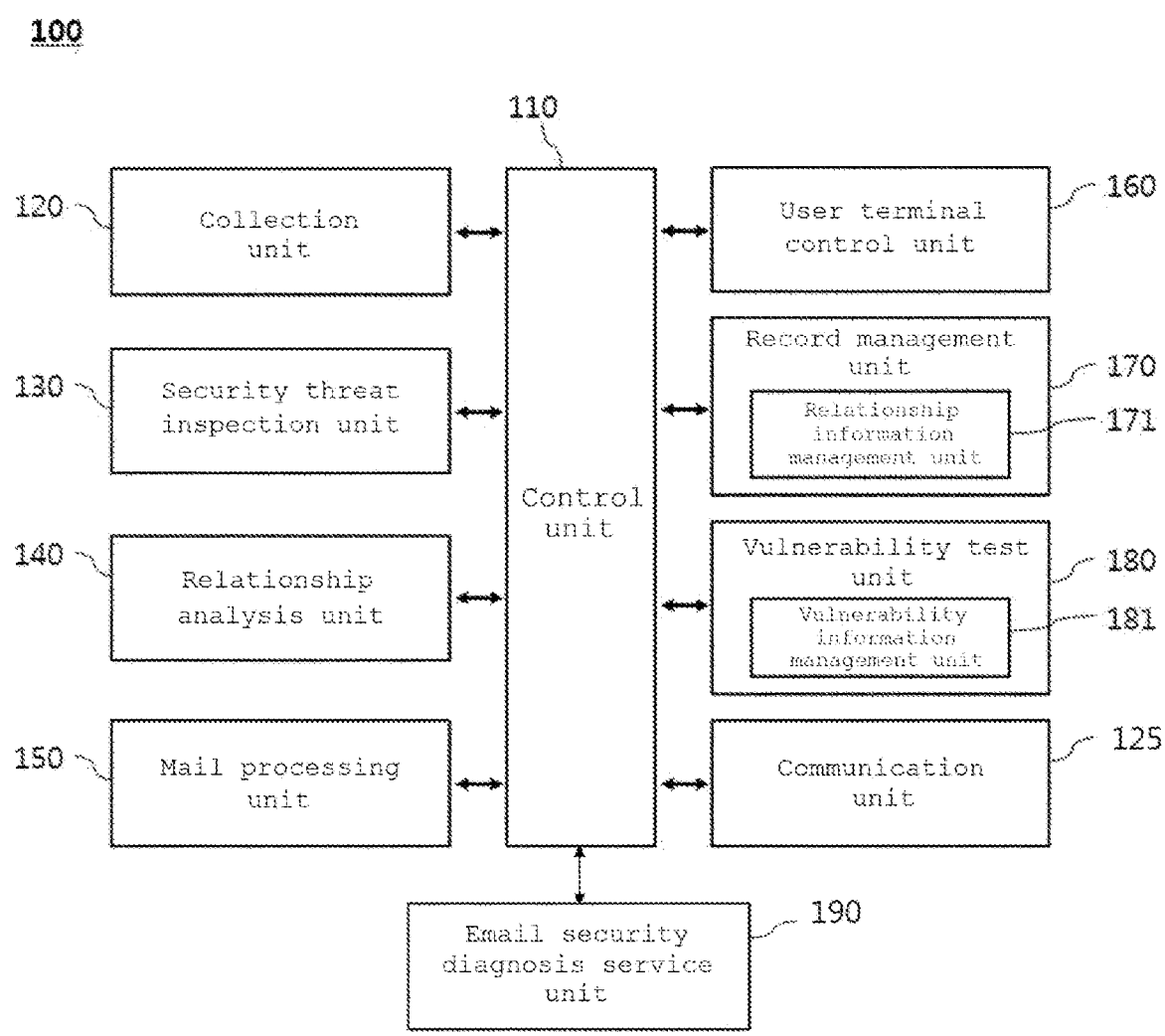
FIG. 2 is a block diagram showing a device for providing a mail security service according to an embodiment of the present invention.

FIGS. 2 and 3 are block diagrams showing a device for providing a mail security service according to an embodiment of the present invention.

Referring to FIGS. 2 and 3, the service providing device 100 according to an embodiment of the present invention may include a control unit 110, a collection unit 120, a security threat inspection unit 130, a relationship analysis unit 140, a mail processing unit 150, a user terminal control unit 160, a record management unit 170, a vulnerability test unit 180, a communication unit 125, and an email security diagnosis service unit 190.

The control unit 110 may be implemented as one or more processors for overall control of the operation of each component in the service providing device 100.

The communication unit 125 may include one or more communication modules for communicating with a network in which the user terminal 200 or the mail server 300 is located.

The collection unit 120 may collect mail information transmitted and received between one or more user terminals 200. The mail information may include email header information, an email subject, an email message body, the number of times of receiving mail during a predetermined period, and the like.

Specifically, the email header information may include the IP address of the mail sending server, information on the host name of the mail sending server, information on the mail domain of the sender, the mail address of the sender, the IP address of the mail receiving server, information on the host name of the mail receiving server, information on the mail domain of the recipient, the mail address of the recipient, information on the protocol of the mail, information on the time of receiving the mail, information on the time of sending the mail, and the like.

In addition, the email header may include network path information required in the process of sending and receiving mail, information on the protocol used between mail service systems for exchanging mail, and the like.

Additionally, the mail information may include an extension of an attached file, hash information of the attached file, a name of the attached file, a contents body of the attached file, uniform resource locator (URL) information, and the like. The attached file may include additional contents for transferring additional information or requesting reply of information, in addition to the message body of the mail that the sender desires to transfer to the recipient.

The contents may provide text, images, videos, and the like. The recipient may confirm the contents by executing an application corresponding to the file attached to the mail. In addition, the recipient may download the file attached to the mail to a local storage device to store and manage therein.

The extension of an attached file may distinguish a file format or type. The extension of an attached file may be generally distinguished by a character string indicating file attributes or an application creating the file. For example, a text file may be distinguished by an extension such as [file name].txt, an MS-word file by [file name].doc (docx), and a Hangul file by [file name].hwp. In addition, the extension of an image file may be classified into gif, jpg, png, tif, and the like.

Additionally, an execution file, which is a computer file performing a task directed according to a coded command, may be classified into [filename].com, [filename].exe, [filename].bat, [filename].dll, [filename].sys, [filename].scr, and the like.

The hash information of the attached file may guarantee integrity of information by inspecting forgery and alteration of the information. The hash information or hash value may be mapped to a bit string of a predetermined length for arbitrary data having a predetermined length through a hash function.

Through this, hash information output through the hash function for the initially created attached file has a unique value. The output hash information or hash value has a unidirectionality that does not allow extraction of data inversely input into the function. In addition, the hash function may guarantee avoidance of collision that cannot be accomplished by calculation of another input data that provides an output the same as the hash information or hash value output for one given input data. Accordingly, when data of the attached file is changed or added, the hash function returns a different output value.

As the unique hash information of the attached file allows comparison of hash information or hash value for a file exchanged through a mail in this way, modification, forgery, alteration of the file can be confirmed. In addition, since the hash information is fixed as a unique value, preventive measures can be taken in advance by utilizing reputation information, which is a database of history for the files created with a malicious intention. Additionally, the hash function may be used in a technique and version that can guarantee unidirectionality and collision avoidance.

For example, the hash information may be used as information for searching for existence of a malicious code in a file through a Virus Total website or a Malwares website. Information such as a file provider, a hash value of a file, and the like may be provided through a website that provides analysis of hash information of the file. In addition, as a result of searching for the hash information of a file may be used to cross-check the reputation information determined by global companies that provide a number of IT information security solutions, it is possible to determine with more reliable information.

According to a preset security threat architecture, the security threat inspection unit 130 may process step-by-step matching of a mail security process corresponding to the mail information, inspect the mail information by the matching-processed mail security process, and store and manage mail security inspection information according to a result of the inspection.

The security threat architecture may be classified into a spam mail security threat, a malicious code security threat, a social engineering security threat, and an internal information leakage security threat. The type, level, process, priority, and processing order of the security threats may be set by the security threat architecture.

The mail security process corresponding to the security threat architecture may include a spam mail security process, a malicious code security process, a phishing mail security process, and a mail export security process.

As for the mail security process, a different mail security process corresponding to an incoming mail or an outgoing mail may be determined according to the security threat architecture. In addition, the inspection order or inspection level of the mail security process may be determined by a preset security level and architecture.

In the mail security process, a flexible resource allocation method of allocating an independently classified process as a resource when mail information for receiving or sending mail is transmitted from the user terminal 200, and immediate execution of the process in an inspection area allocated from the mail information may be explained as the concept of a virtual space. In the method of allocating resources in a virtual space, when the process is completed, the mail security process may immediately process the work in the inspection area allocated from mail information that flows in sequentially.

Contrarily, when a requested task is processed, a virtual environment, i.e., an environment in which a predetermined process of which the processing is limited within a single resource is assigned like a virtual machine, may have an idle time in which other processes wait until a specific process is completed. In a method of analyzing through a process like this, flexible resources may have an advantage in processing speed and performance in comparison with fixed resources.

The security threat inspection unit 130 may classify mails by reception or transmission purposes according to the mail information collected by the collection unit 120. Thereafter, the security threat inspection unit 130 may acquire mail security inspection information for each mail by matching and analyzing the mail security process sequentially or based on a set priority.

The spam mail security threat may include mail types unilaterally and indiscriminately distributed to unspecified many people in large quantities for the purpose of advertisement, public relations, and the like between unrelated senders and receivers. In addition, a large quantity of spam mails may impose load on the data processing power of the mail system and lower the processing capability of the system. In addition, the spam mail has a risk in that users may be unintentionally linked to indiscriminate information included in the message body or the like, and it may be disguised as information for potential phishing scam.

The security threat inspection unit 130 may include a spam mail inspection unit 131 to detect and filter spam mails like this. The spam mail inspection unit 131 may match, when the mail security process is a spam mail security process, the mail information including mail header information, mail subject, mail message body, the number of times of receiving mail during a predetermined period, and the like to preset spam indexes step by step.

The spam mail inspection unit 131 may use mail information including mail header information, mail subject, mail message body, and the like as inspection items in the spam indexes through a predetermined pattern inspection or the like that may classy a mail as a spam mail. Through this, the spam mail inspection unit 131 may acquire, store, and manage spam mail inspection information by matching the spam indexes step by step.

Inspection items based on the items included in the mail information and level values obtained through inspection may be set in steps as the spam indexes. According to an embodiment of the present invention, the spam indexes may be subdivided and configured in steps of Level 1, Level 2, Level 3, . . . , Level [n].

Spam index level 1 may match mail subject data included in the mail information on the basis of big data and reputation information. Through this, an evaluated level value may be acquired as inspection information of spam index level 1. The level value may be set as information that can be quantitatively measured. For example, when the mail subject, which is an inspection item, includes a phrase such as 'advertisement', 'public relations', or the like, and matches the information defined as a spam mail in the big data and reputation information, the inspection information of spam index level 1 may be evaluated as '1' among the level values classified into 0 and 1. Through this, inspection information of spam index level 1 may be acquired as '1'.

Additionally, spam index level 2 may match data included in the mail information on the basis of user-designated keywords. Through this, an evaluated level value may be acquired as inspection information of spam index level 2. For example, when the mail message body, which is an inspection item, includes a keyword including 'Special price', 'Super special price', 'Bargain', 'Sale', 'Sold out', or the like, and matches the information defined as a spam mail in the user-designated keywords, the inspection information of spam index level 2 may be evaluated as '1' among the level values classified into 0 and 1. Through this, inspection information of spam index level 2 may be acquired as '1'.

As the next step, spam index level 3 may match data included in the mail information on the basis of image analysis. Through this, an evaluated level value may be acquired as inspection information of spam index level 3.

For example, when data extracted by analyzing an image included in the mail message body, which is an inspection item, includes a phone number starting with '080', and matches the information defined as a spam mail in the image analysis, the inspection information of spam index level 3 may be evaluated as '1' among the level values classified into 0 and 1. Through this, inspection information of spam index level 3 may be acquired as '1'.

In this way, the inspection information acquired in units of spam index levels through the spam mail security process may be finally summed up as '3' and stored and managed as spam mail inspection information. The spam mail inspection information summed up in this way may be included and managed in the mail security inspection information, and may be used as security threat determination information in the mail processing unit 150.

The security threat inspection unit 130 may further include a malicious code inspection unit 132. When the mail security process is a malicious code security process, the malicious code inspection unit 132 may match the mail information, further including the extension of the attached file, hash information of the attached file, the name of the attached file, the contents body of the attached file, uniform resource locator (URL) information, and the like, to a preset malicious code index step by step.

The malicious code inspection unit 132 may use the contents body of the attached file and the uniform resource locator (URL) information included in the message body, together with the extension of the attached file, hash information of the attached file, the name of the attached file, and the like, which can be confirmed from the attribute values of the attached file, as malicious code index inspection items. Through this, the malicious code inspection unit 132 may acquire, store, and manage malicious code inspection information by matching the malicious code indexes step by step according to the items.

Inspection items based on the items included in the mail information and level values obtained through inspection may be set as the malicious code indexes step by step. According to an embodiment of the present invention, the malicious code indexes may be subdivided and configured in steps of Level 1, Level 2, Level 3, . . . , Level [n].

Malicious code index level 1 may match the name of the attached file or the extension of the attached file included in the mail information on the basis of big data and reputation information. Through this, an evaluated level value may be acquired as inspection information of malicious code index level 1. For example, when the name of the attached file or the extension of the attached file, which are inspection items, includes 'Trojan' or 'exe', and matches the information defined as a malicious code in the big data and reputation information, the inspection information of malicious code index level 1 may be evaluated as '1' among the level values classified into 0 and 1. Through this, inspection information of malicious code index level 1 may be acquired as '1'.

Additionally, malicious code index level 2 may match hash information of the attached file of a mail on the basis of big data and reputation information. Through this, an evaluated level value may be acquired as inspection information of malicious code index level 2. For example, when the hash information of the attached file, which is an inspection item, is analyzed as 'a1b2c3d4', and matches the information defined as a malicious code in the reputation information, the inspection information of malicious code index level 2 may be evaluated as '1' among the level values classified into 0 and 1. Through this, inspection information of malicious code index level 2 may be acquired as '1'.

As the next step, malicious code index level 3 may match uniform resource locator (URL) information included in the attached file or the mail message body on the basis of URL reputation information. Through this, an evaluated level value may be acquired as inspection information of malicious code index level 3. For example, when the URL information, which is an inspection item, is confirmed as 'www.malicious-code.com', and matches the information defined in the URL reputation information as a harmful site including a malicious code file, the inspection information of malicious code index level 3 may be evaluated as '1' among the level values classified into 0 and 1. Through this, inspection information of malicious code index level 3 may be acquired as '1'. In addition, the malicious code inspection unit 132 may respond to zero-day attacks that may be omitted in the URL reputation information. The malicious code inspection unit 132 may change a link IP address for a URL without having reputation information to an IP address of a specific system and provide the changed IP address to the user terminal 200. When the user terminal 200 desires to access the URL, it may access the IP address of the specific system changed by the malicious code inspection unit 132. The specific system that has been previously changed to a link IP address for the URL may continuously inspect whether or not a malicious code is included up to the endpoint of the URL.

In this way, the inspection information acquired in units of malicious code index levels through the malicious code security process may be finally summed up as '3' and stored and managed as malicious code inspection information. The malicious code inspection information summed up in this way may be included and managed in the mail security inspection information, and may be used as security threat determination information in the mail processing unit 150.

The security threat inspection unit 130 may further include a phishing mail inspection unit 133. The phishing mail inspection unit 133 may match, when the mail security process is a phishing mail security process, relationship analysis information acquired through the relationship analysis unit 140 to a preset relationship analysis index step by step. The relationship analysis information may be acquired through analysis of the mail information including mail information and attribute information of a mail confirmed as normal.

The phishing mail inspection unit 133 may use the incoming mail domain, outgoing mail domain, incoming mail address, outgoing mail address, mail routing information, mail message body information, and the like, which can be extracted from a mail determined as normal, as relationship analysis index inspection items. Through this, the phishing mail inspection unit 133 may acquire, store, and manage phishing mail inspection information by matching the relationship analysis indexes step by step according to the items. Through this, the phishing mail inspection unit 133 may detect similar domains and filter mails that may pose a security threat by tracing or verifying mail delivery routes.

Inspection items based on the relationship analysis information and level values obtained through inspection may be set as the relationship analysis indexes step by step. According to an embodiment of the present invention, the relationship analysis indexes may be subdivided and configured in steps of Level 1, Level 2, Level 3, . . . , Level [n].

Relationship analysis index level 1 may match the domain of the sender's mail, the address of the sender's mail, and the like on the basis of reputation information. Through this, an evaluated level value may be acquired as inspection information of relationship analysis index level 1. For example, when the domain of an outgoing mail is '@phishing.com' and the sender's mail address includes 'phishing@', which are inspection items, and matches the information defined as a malicious code in the reputation information, the inspection information of relationship analysis index level 1 may be evaluated as '1' among the level values classified into 0 and 1.

Additionally, relationship analysis index level 2 may match the domain of the sender's mail, the address of the sender's mail, and the like on the basis of the relationship analysis information. Through this, an evaluated level value may be acquired as inspection information of relationship analysis index level 2. For example, when the domain of an outgoing mail is '@phishing.com' and the sender's mail address includes 'phishing@', which are inspection items, and does not match the information defined as attribute information of a normal mail in the relationship analysis information, the inspection information of relationship analysis index level 2 may be evaluated as '1' among the level values classified into 0 and 1. Through this, inspection information of relationship analysis index level 3 may be acquired as '1'.

As the next step, relationship analysis index level 3 may match mail routing information or the like on the basis of the relationship analysis information. Through this, an evaluated level value may be acquired as inspection information of relationship analysis index level 3. For example, when the mail routing information, which is an inspection item, is confirmed as '1.1.1.1', '2.2.2.2', and '3.3.3.3', and the routing information, which is the mail transmission path, does not match the information defined as attribute information of a normal mail in the relationship analysis information, the inspection information of relationship analysis index level 3 may be evaluated as '1' among the level values classified into 0 and 1. Through this, inspection information of relationship analysis index level 3 may be acquired as '1'.

In this way, the inspection information acquired in units of relationship analysis index levels through the phishing mail security process may be finally summed up as '3' and stored and managed as phishing mail inspection information. The phishing mail inspection information summed up in this way may be included and managed in the mail security inspection information, and may be used as security threat determination information in the mail processing unit 150.

The security threat inspection unit 130 may include a mail export inspection unit 134 to respond to internal information leakage security threats. The mail export inspection unit 134 may match, when the mail security process is a mail export security process, mail information to a preset mail export management index on the basis of the mail information step by step.

The mail export inspection unit 134 may use the attribute information of the mail information as a mail export management index inspection item. In addition, the management index inspection item may use internally managed information on the IP address assigned to the user terminal 200.

Inspection items set in advance and level values obtained through inspection may be set in steps as the mail export management indexes. According to an embodiment of the present invention, the mail export management indexes may be subdivided and configured in steps of Level 1, Level 2, Level 3, . . . , Level [n].

The mail export management index may include an item for controlling to register only allowed IP addresses among the IP addresses assigned to the user terminal 200 as mail information for the inspecting the outgoing environment. Since an unauthenticated user terminal is likely to leak internal information and likely to pose a security threat through a mail, management indexes for preventing the leakage and threat may be managed.

In addition, the mail export inspection unit 134 may classify the mail export management indexes into inspection items such as information on the IP address, information on the number of times of transmission, and the like. In addition, the mail export inspection unit 134 may reduce the threat of internal information leakage by additionally including a control unit, such as an approval process or the like, as an item for inspecting the outgoing environment of mail. Through this, the mail export inspection unit 134 may store and manage level values, calculated by matching the inspection item through the mail export process, as mail export inspection information.

The relationship analysis unit 140 may store and manage relationship analysis information acquired through analysis of the mail information and the trust authentication log. When the record management unit 170 processes mail information as a normal mail according to the security threat determination information, the trust authentication log may include record information including the incoming mail domain, outgoing mail domain, incoming mail address, outgoing mail address, mail routing information, mail message body information, and the like.

The mail processing unit 150 may process a mail state according to security threat determination information acquired through analysis of the mail security inspection information and the mail information.

The mail processing unit 150 may perform the mail security process according to a preset priority. When the security threat determination information acquired through the mail security process is determined as an abnormal mail, the mail processing unit 150 may process the mail state by determining whether or not to stop subsequent mail security processes. Through this, when a problem is found first at the inspection step, the mail processing unit 150 may perform only the processes needed at the inspection step according to the priority, determine whether or not to stop the inspection, and terminate the process without performing subsequent inspection steps. Through this, complexity of the system can be reduced and processing efficiency can be improved by securing efficiency of the mail security service.

Information acquired by combining spam mail inspection information, malicious code inspection information, phishing mail inspection information, and mail export inspection information calculated by the security threat inspection unit 130 may be used as the mail security inspection information. For example, when the score calculated from the spam mail inspection information is '3', the score calculated from the malicious code inspection information is '2', the score calculated from the phishing mail inspection information '1', and the score calculated from the mail export inspection information is '0', the score summed up as the mail security inspection information through the process performed on the mail information by the security threat inspection unit 130 may be acquired as '7'. At this point, the mail may be classified as a normal mail when the overall score is in a range of 0 to 3 on the basis of the preset security threat determination information, as a gray mail when the overall score is in a range of 4 to 6, and as an abnormal mail when the overall score is in a range of 7 to 12. Accordingly, a mail of which the mail security inspection information is '7' may be determined as an abnormal mail. In addition, a result value of each inspection information item included in the information on mail information inspection may be assigned with an absolute priority according to the item, or the priority may be determined by the information according to a weight.

The mail processing unit 150 may include a mail distribution processing unit 151 for processing a mail determined as a normal mail according to the security threat determination information to put the mail into a receiving or sending state that can be processed by the user terminal.

In addition, the mail processing unit 150 may further include a mail discard processing unit 152 for processing a mail determined as an abnormal mail according to the security threat determination information to put the mail into a state that does not allow access of the user terminal.

In addition, the mail processing unit 150 may further include a mail harmless processing unit 153 for converting a mail determined as a gray mail according to the security threat determination information into non-execution file contents, and providing the non-execution file contents so that the user terminal may selectively process the mail state.

Generally, a gray mail may be classified into a spam mail or a junk mail, or may be classified as a normal mail on the contrary. In the present invention, the gray mail may be defined as a mail type that is classified when the security threat determination information is calculated as a medium value in a predetermined range, which cannot be determined as normal or abnormal. The mail harmless processing unit 153 may convert the gray mail including the message body of suspicious contents into an image file and provides the mail in a state that the user terminal 200 may confirm. In addition, the mail harmless processing unit 153 may remove or modify a part in an attached file being suspicious of a malicious code and provide the mail to the user terminal 200.

The user terminal control unit 160 may control transmission of mail information when the Internet Protocol (IP) address information used by the user terminal 200 in the network corresponds to an unauthorized IP address set in advance.

The record management unit 170 may store and manage the mail information processed according to the security threat determination information as record information. The record management unit 170 may further include a relationship information management unit 171 for storing and managing, when a mail is processed as a normal mail according to the security threat determination information, the record information including the incoming mail domain, outgoing mail domain, incoming mail address, outgoing mail address, mail routing information, mail message body information, and the like as a trust authentication log. Through this, the trust authentication log may be used for reliable relationship information analysis on the recipient's and sender's mail information. In addition, reliability of the information included in the trust authentication log can be guaranteed as data are continuously accumulated through exchange of information therebetween.

In addition, when a mail is processed as an abnormal mail according to the security threat determination information, the record management unit 170 may use the record information including the incoming mail domain, outgoing mail domain, incoming mail address, outgoing mail address, mail routing information, mail message body information, and the like as an index for determining an abnormal mail when the mail security process is performed.

The vulnerability test unit 180 may convert a mail determined as an abnormal mail according to the security threat determination information into non-execution file contents, and provide the non-execution file contents so that the user terminal may receive or transmit. The vulnerability test unit 180 may include a vulnerability information management unit 181 for acquiring identification information of the user terminal receiving or transmitting the abnormal mail, and storing and managing the identification information as vulnerability information of each type.

Meanwhile, the email security diagnosis service unit 190 may collect processing result information of the security threat inspection unit 130 processed according to a mail security threat architecture, configure email security diagnosis service information from the processing result information, and provide the email security diagnosis service information to the user terminal 200 as an email security diagnosis service.

More specifically, the email security diagnosis service unit 190 may collect matching result information for each step of the mail security process based on the security threat architecture processed by the security threat inspection unit 130, and determine a threat level ratio factor for applying one or more quantitative classification conditions corresponding to the collected matching result information.

In addition, the email security diagnosis service unit 190 may calculate quantitative analysis information corresponding to the threat level ratio factor from the matching result, and determine a score of each classified threat level of the mail system to be diagnosed on the basis of the quantitative analysis information.

Accordingly, the email security diagnosis service unit 190 may configure an email security diagnosis analysis report based on the score of each classified threat level, and provide the configured email security diagnosis analysis report information to the user terminal 200.

As described above, as the security threat architecture may be classified into a spam mail security threat, a malicious code security threat, a social engineering security threat, and an internal information leakage security threat, and the type, level, process, priority, and processing order of the security threats may be set by the security threat architecture, and the mail security process corresponding to the security threat architecture may include a spam mail security process, a malicious code security process, a phishing mail security process, and a mail export security process, the number of matching cases of each threat level ratio factor may be calculated by matching each matching processing result to various quantitative classification conditions. These quantitative classification conditions may also be referred to as threat level element classification criteria.

In addition, the email security diagnosis service unit 190 may confirm a comprehensive security threat level of the email system to be diagnosed by applying the quantitative analysis information of each threat level ratio factor to a preset formula for calculating the score of each classified threat level, and diagnosis analysis report information capable of providing a user's response guide corresponding thereto may be configured.

Accordingly, the user terminal 200 may receive the diagnosis analysis report information, accurately confirm the email security threat status based on the security threat architecture on the basis of actual quantitative data, and receive a guide corresponding thereto and take an action to block in advance more diversified security threats such as targeted email attacks or the like.

Figure 4:
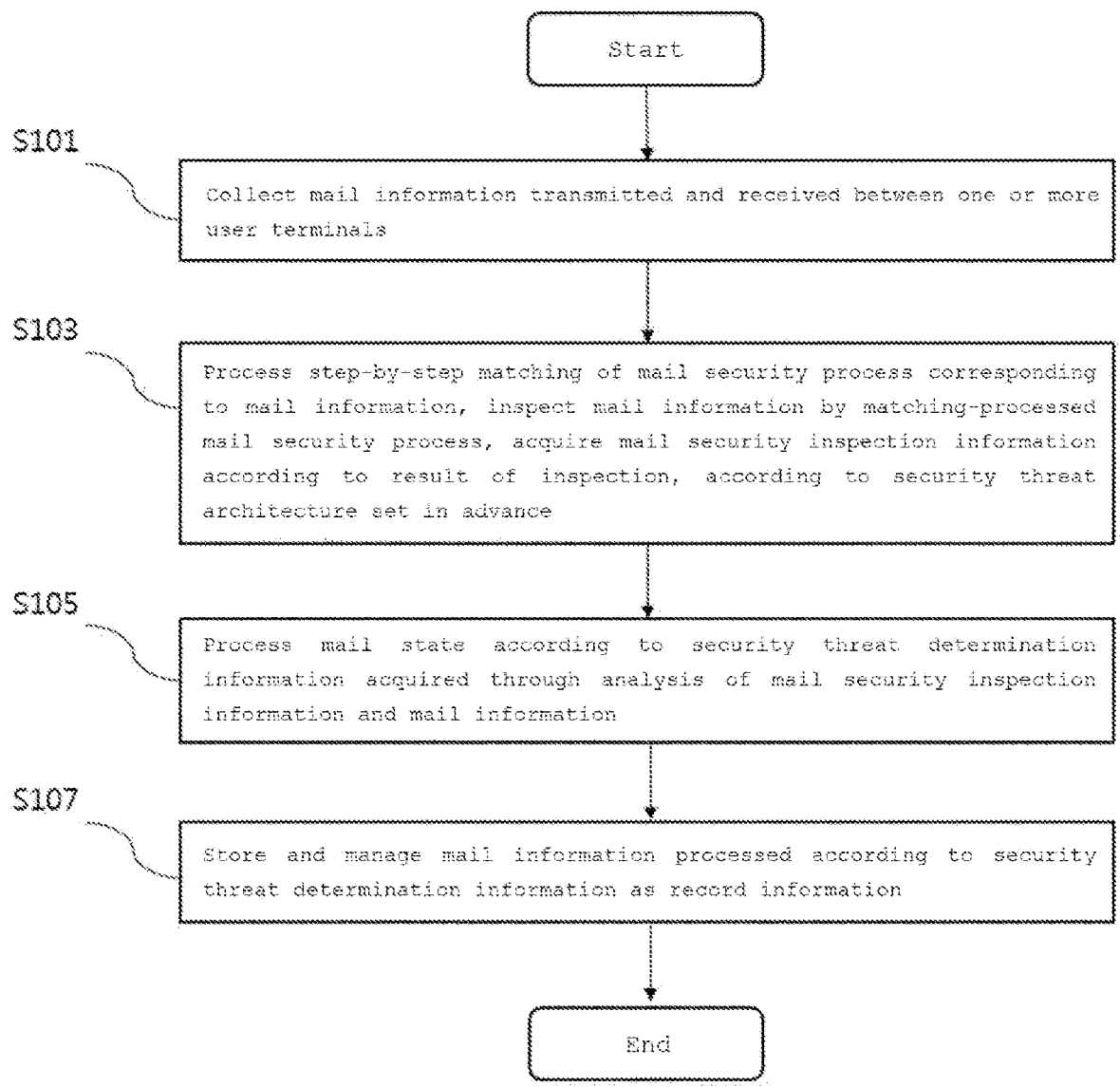
FIG. 4 is a flowchart for explaining a method of operating a device for providing a mail security service according to an embodiment of the present invention.

FIG. 4 is a flowchart illustrating a method of operating a device for providing a mail security service according to an embodiment of the present invention.

Referring to FIG. 4, in the method of operating a device for providing a mail security service, a collection step (S101) may be collected information on the mail transmitted and received between one or more user terminals 200.

A security threat inspection step (S103) may process step-by-step matching of a mail security process corresponding to the mail information according to a preset security threat architecture. Thereafter, the security threat inspection step (S103) may inspect the mail information by the matching-processed mail security process. Through this, the security threat inspection step (S103) may store and manage mail security inspection information according to a result of the inspection.

In the mail security process, a different mail security process corresponding to an incoming mail or an outgoing mail may be determined according to the security threat architecture. In addition, the inspection order or inspection level of the mail security process may be determined by a preset security level and architecture.

A mail processing step (S105) may process a mail state according to security threat determination information acquired through analysis of the mail security inspection information and the mail information.

The mail processing step (S105) may perform the mail security process according to a preset priority. When the security threat determination information acquired through the mail security process is determined as an abnormal mail, the mail processing step (S105) may process the mail state by determining whether or not to stop subsequent mail security processes. Through this, when a problem is found first at the inspection step, the mail processing step (S105) may perform only the processes needed at the inspection step according to the priority, determine whether or not to stop the inspection, and terminate the process without performing subsequent inspection steps. Through this, complexity of the system can be reduced and processing efficiency can be improved by securing efficiency of the mail security service.

The record management step (S107) may store and manage the mail information processed according to the security threat determination information as record information. The record management step (S107) may further include a relationship information management step of storing and managing, when a mail is processed as a normal mail according to the security threat determination information, the record information including the incoming mail domain, outgoing mail domain, incoming mail address, outgoing mail address, mail routing information, mail message body, and the like as a trust authentication log.

A relationship analysis step (not shown) may store and manage relationship analysis information acquired through analysis of the mail information and the trust authentication log.

The spam mail inspection step (S103) may further include a spam mail inspection step of matching, when the mail security process is a spam mail security process, the mail information, including one or more among email header information, email subject, email message body, and the number of times of receiving mail during a predetermined period, to preset spam indexes step by step. Additionally, the spam mail inspection step (S103) may further include a malicious code inspection step of matching, when the mail security process is a malicious code security process, the mail information, including one or more among the extension of the attached file, hash information of the attached file, the name of the attached file, the contents body of the attached file, uniform resource locator (URL) information, and the like, to a preset malicious code index step by step. The security threat inspection step (S103) may further include a phishing mail inspection step of matching, when the mail security process is a phishing mail security process, relationship analysis information to a preset relationship analysis index step by step. In addition, the security threat inspection step (S103) may further include a mail export inspection step of matching, when the mail security process is a mail export security process, mail information to a preset mail export management index on the basis of the mail information step by step.

The mail processing step (S105) may further include a mail distribution processing step of processing a mail determined as a normal mail according to the security threat determination information to put the mail into a receiving or sending state that can be processed by the user terminal. In addition, the mail processing step (S105) may further include a mail discard processing step of processing a mail, which is determined as an abnormal mail according to the security threat determination information, to put the mail into a state that does not allow access of the user terminal.

Additionally, the mail processing step (S105) may further include a mail harmless processing step of converting a mail determined as a gray mail according to the security threat determination information into non-execution file contents, and providing the non-execution file contents so that the user terminal may selectively process the mail state.

A vulnerability test step (not shown) may convert a mail determined as an abnormal mail according to the security threat determination information into non-execution file contents, and provide the non-execution file contents so that the user terminal may receive or transmit. The vulnerability test step may further include a vulnerability information management step of acquiring identification information of the user terminal that has received or transmitted the abnormal mail, and storing and managing the identification information as vulnerability information of each type.

Figure 5A:
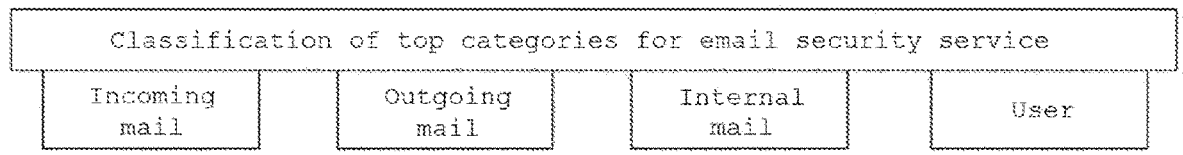
FIGS. 5A, 5B, and 5C are exemplary views for explaining an inspection method according to an architecture of a mail security service according to an embodiment of the present invention.
Figure 5B:
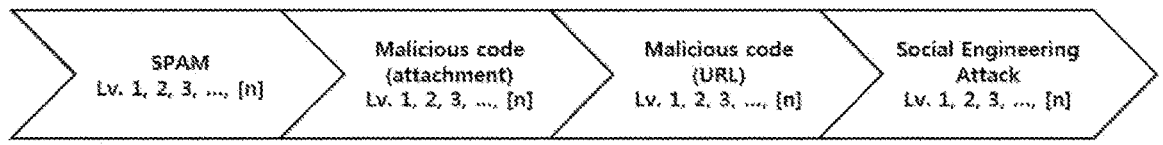
Figure 5C:
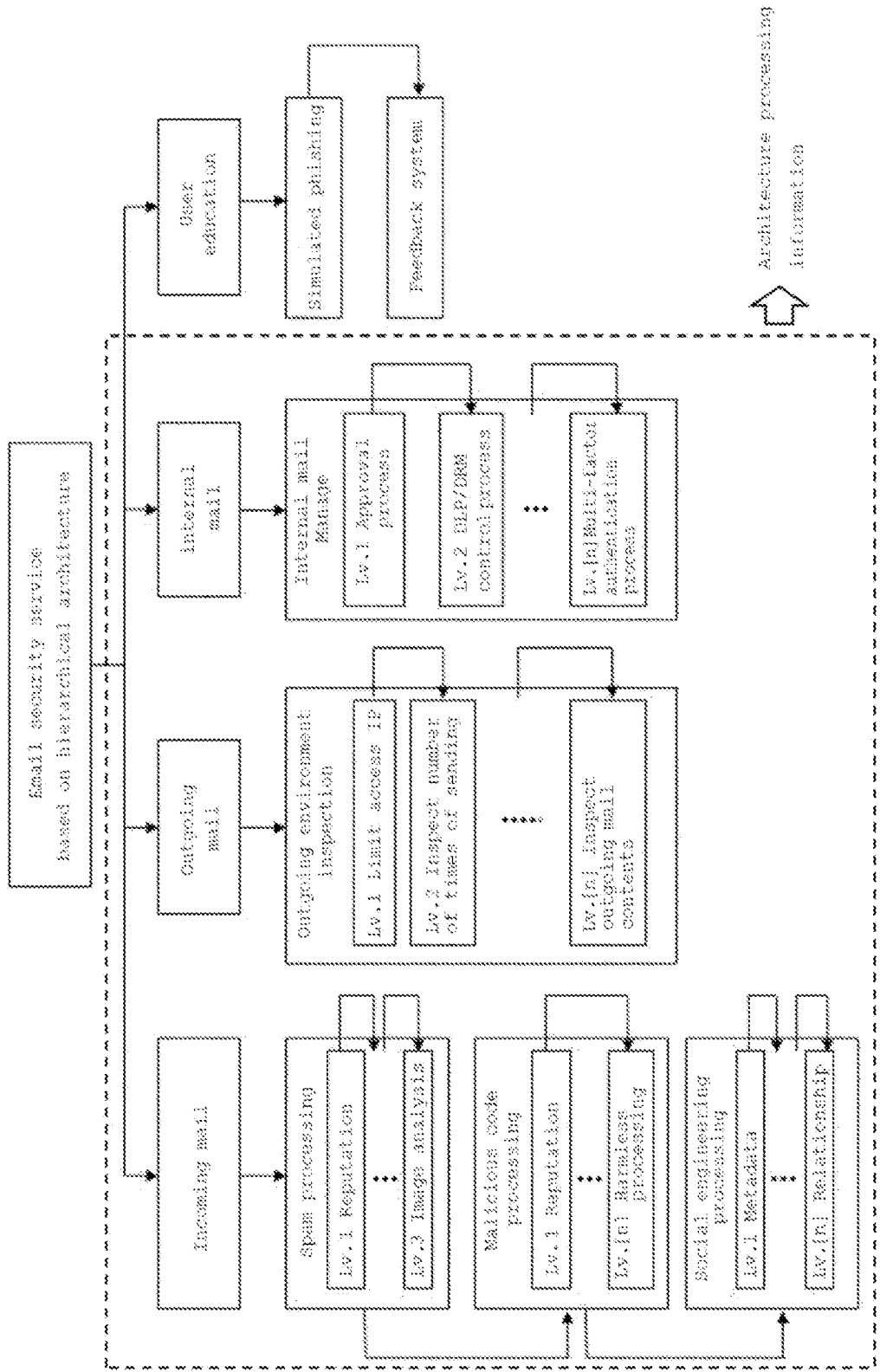

FIGS. 5A, 5B, and 5C are exemplary views for explaining an inspection method according to an architecture of a mail security service according to an embodiment of the present invention.

Referring to FIGS. 5A, 5B, and 5C, it is an architecture for providing a mail security service, and the type and level, process, priority, processing order, and the like of security threats may be set according thereto. The architecture of the mail security service is divided into top categories such as incoming mail, outgoing mail, internal mail, user education, and the like, and the hierarchical and step-by-step configuration and processing method may be applied to each category as a substructure. The top categories may be classified on the basis of the attribute values included in the mail information or on the basis of classification of systems to be accessed according to the purpose of using the mail by the user terminal 200.

One or more specific mail security processes may be assigned within each security threat type, and the mail security processes may be divided into levels and sequentially executed step by step. Specifically, the security threat types may be classified into spam, malicious code (attachment), malicious code (URL), social engineering attack, and the like. A process of inspecting the security threat type according thereto may be sequentially performed. In addition, the inspection processes may be divided into steps of level 1, 2, 3, . . . [n] in each security threat type to be performed sequentially. At this point, an inspection result may be acquired as specific inspection items and indexes are assigned to each level.

In addition, according to setting of the architecture, the mail security process in each security threat type may also be performed in a way of processing allocated inspection areas in parallel.

The security threat type of the incoming mail, which is one of the top categories, may be divided into sublayers. Specifically, the security threat type may be classified into spam processing, malicious code processing, social engineering processing, and the like.

In order to inspect the security threat of an incoming mail, whether or not the incoming mail is a spam mail may be inspected on the basis of reputation at level 1 (Lv. 1) in the spam processing section. Thereafter, when no problem is found in the spam mail inspection based on reputation, whether or not the incoming mail is a spam mail may be inspected at level 2 (Lv. 2) through filtering on the basis of user-designated keywords.

After the inspection of level 2 is completed, whether or not the incoming mail is a spam mail may be inspected at level 3 (Lv. 3), which is a next step, through analysis of contents based on image. In this way, the mail security service architecture may perform inspection at each level through a specific spam filtering process within the spam processing type, and proceeds to a next level when the inspection is completed. In addition, the mail security service architecture may proceed to a malicious code processing step of determining whether or not a malicious code is included in the mail after the spam inspection of the mail through spam processing is completed.

The malicious code processing may determine whether or not a malicious code of level 1 based on reputation is included, and proceed to a next step when the mail is confirmed to be normal. When it is determined at level n (Lv. n) that an attached file may include a malicious code, the malicious code processing step may be terminated through a harmless process that modifies the execution code included in the attached file. When the malicious code processing inspection is completed, the inspection step may proceed to a social engineering processing inspection step. At the social engineering process inspection step, a response may be processed or requested according to inspection result information after executing a process of inspecting social engineering attack mail, which is based on metadata of level 1 (Lv. 1) and relationship analysis of level n (Lv. n).

The security threat type of the outgoing mail, which is one of the top categories, may be divided into sublayers. The inspection may be performed by classifying the category of the outgoing mail into steps of spam processing, malicious code processing, and social engineering processing, like the security threat type of the incoming mail.

Particularly, security threat inspection of outgoing mail may include an outgoing environment inspection step. When one or more user terminals 200 access the system for the purpose of sending mail, the outgoing environment inspection step may perform a step of level 1 (Lv. 1) of verifying whether the user terminal has an IP address allowed according to a previously registered whitelist. When the user terminal 200 authenticated through the inspection of level 1 satisfies the number of times of sending mail in less than a predetermined reference number of times, it can be determined as a normal mail and proceeds to the next step. Thereafter, whether or not the mail is normal may be verified at the step of level n (Lv. n) by inspecting the contents of the outgoing mail in advance and executing a process of determining whether or not the mail is abnormal.

An internal mail management step capable of preventing leakage of internal information to a sublayer may be performed on the internal mail, which is one of the top categories. At the internal mail management step, abnormal mail may be inspected through an approval process of level 1 (Lv. 1). The approval process may determine the risk of information leakage of a mail including internal information.

The approval process may be performed in a way of previously censoring mail contents approved sequentially by the mail management system and sent to the outside. Then, as a step of level 2 (Lv. 2), control processes of Data Loss Prevention (DLP) and Digital Rights Management (DRM) may be performed to inspect leakage of internal information. The DLP control process may detect and control a behavior of attempting to transmit information by accessing a system violating a policy without permission such as approval or the like. The DRM control process may detect and control an attempt of decrypting an encrypted internal document or attaching a decrypted file to a mail without permission such as approval or the like. Thereafter, the step of level n (Lv. n) may provide a multi-step authentication process such as step 1, step 2, and the like as a step of authenticating the user terminal 200 when a mail is to be sent. Through this, processing of normal mail can be guaranteed by blocking users who attempt snatching or stealing of account.

The user education, which is one of the top categories, may include the steps of simulated phishing and a feedback system as sublayers. At the simulated phishing step, information such as the identification value of the user terminal 200 having a history of using mail containing security threats and the number of times of using the mail may be stored and managed. A mail configured in a way actually harmless to the system or contents may be used as the security threat. Through this, the feedback system may provide statistical values calculated through the simulated phishing or result values obtained by analyzing threat levels.

The security threat inspection configured for each category may be determined by the architecture and security levels. Accordingly, the inspection order and inspection level can be determined, and abnormalities can be confirmed according to sequential inspections. In addition, the priority of the inspection order and inspection level may be set according to the architecture and security levels. When a problem is found according to the obtained inspection result, the process performed according to the priority may perform a process needed at that step and determine whether or not to terminate the inspection. The above problem can be solved by discarding or returning the mail so that the user terminal 200 may not confirm the mail when the mail is determined as a spam mail or a mail containing malicious codes. When the problems of a mail are processed through an inspection process at a specific step in this way, subsequent inspection steps or remaining inspection steps under parallel processing may be terminated without being performed.

Meanwhile, some processes of the architecture-based inspection of the security threat inspection unit 130 according to an embodiment of the present invention may be performed based on an artificial intelligence process.

More specifically, for example, in the case of behavior detection, the security threat inspection unit 130 may perform a process of detecting behaviors in a virtual environment and classifying a type after detecting ransomware, and for this purpose, a process of detecting behaviors and detecting ransomware code data based on a known artificial intelligence decision-making tree data process may be used.

More specifically, as emails are viewed in a virtual environment, the security threat inspection unit 130 may store the detected behavior information and ransomware information in a database, and learn a behavior detection and ransomware detection model by applying a decision-making tree algorithm to the stored data.

In addition, the security threat inspection unit 130 may detect in real time the email behavior and ransomware collected thereafter and determine a type thereof according to data attribute conditions of the learned model.

In addition, for example, in the case of detecting a malicious URL, the security threat inspection unit 130 may construct a self-organizing map on the basis of URL and HTML data to detect the malicious URL.

In this case, the security threat inspection unit 130 may execute the URL in a virtual environment, collect and learn HTML data, and classify data having common features of malicious URL blocking models based on a self-organizing map algorithm into clusters to construct a learning model data of a map format.

In addition, the security threat inspection unit 130 may also detect a time difference attack by detecting malicious URLs in real time using the learning model data, and reflecting characteristics of network traffic in real time.

Furthermore, the security threat inspection unit 130 may provide a function of permanently deleting a mail classified as being suspicious of a malicious code or retransmitting the mail when the user requests, and when inspection is performed within a virtual machine in order to respond to a malicious code attack, the inspection may be performed on various file extensions.

Particularly, the security threat inspection unit 130 may inspect even a final URL of multiply-linked URLs when whether or not a malicious code is included in a URL is inspected, in addition to detecting new viruses that are not registered in the patterns by performing a behavior-based inspection, in order to respond to a new type malicious code attack using zero-day vulnerability.

In addition, when whether or not a URL includes a malicious code is inspected, the security threat inspection unit 130 may provide the user terminal 200 with a separate function of removing the hyperlink of the URL, separately marking the URL with a separate phrase, or converting the URL into an image, to prevent the user from executing a URL suspicious of being malicious by mistake.

In addition, when whether or not a URL includes a malicious code is inspected, the security threat inspection unit 130 may inspect whether the URL is safe whenever the user executes the URL received in an email in order to block URL activation attacks thereafter, and when a malicious element is included in the URL when whether or not the URL includes a malicious code is inspected, it may be processed to separate and guide the URL to a security web gateway so that the risky element is removed and only safe web site contents are provided to the user terminal 200.

In addition, the security threat inspection unit 130 may analyze the account, originating address, header value, and IP address of the customer company based on an association rule algorithm in order to detect a change in the originating address and forgery and alteration of the header. For example, the security threat inspection unit 130 may construct a forgery and alteration detection model for analyzing the association relation between the originating address, existing header value, and IP address data of the customer company and the originating address, header value, and IP address of a mail received through the same account, on the basis of the association rule algorithm.

Accordingly, when an originating address, header value, or IP address data that violates the association rule in the forgery and alteration detection model is detected, the security threat inspection unit 130 may block the mail and process considering that a change is detected in the originating address, or forgery and alteration of the header is detected.

Meanwhile, the security threat inspection unit 130 may analyze text data of the domain of the customer company account based on a random forest in order to detect and block similar domains. For example, the security threat inspection unit 130 may construct a learning model in which a similar domain detection model based on a random forest algorithm collects account domain data of the customer company.

Accordingly, in the security threat inspection unit 130, the learning model may learn actual domain data of the customer company, extract changed text data in a similar domain that cannot be distinguished with human eyes, determine and block the mail as a mail of a similar domain, and process detected information.

Figure 6:
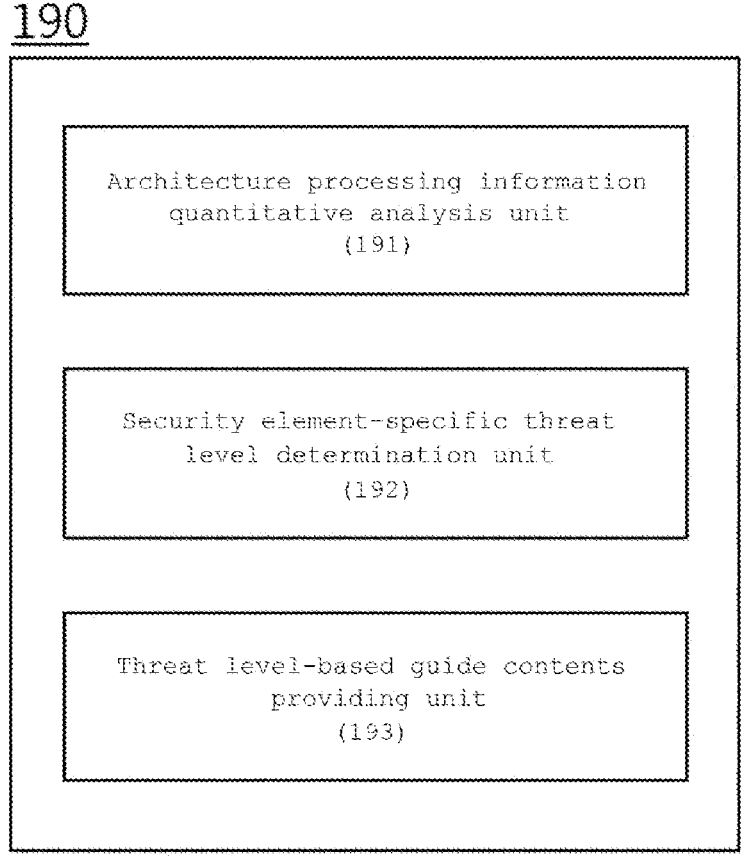
FIG. 6 is a block diagram showing an email security diagnosis service unit according to an embodiment of the present invention in more detail.

FIG. 6 is a block diagram showing an email security diagnosis service unit according to an embodiment of the present invention in more detail.

Referring to FIG. 6, the email security diagnosis service unit 190 according to an embodiment of the present invention includes an architecture processing information quantitative analysis unit 191, a security element-specific threat level determination unit 192, and a threat level-based guide contents providing unit 193.

The architecture processing information quantitative analysis unit 191 collects matching result information according to performing a process for each level of the security threat architecture of the security threat inspection unit 130, and calculates quantitative analysis information for each preset threat level ratio factor according to the classification conditions of one or more threat level element classification criteria generated for the sake of security in sending and receiving email.

More specifically, the architecture processing information quantitative analysis unit 191 may acquire a diagnosis period and a diagnosis domain in correspondence to an email system to be diagnosed. In addition, it may calculate the number of quantitative matches processed in correspondence to the classification conditions of the threat level element classification criteria, on the basis of a result of performing a security process on incoming and outgoing mails based on the security threat architecture for the diagnosis period and diagnosis domain.

Here, the classification conditions of the threat level element classification criteria may be set in correspondence to a result of processing for each security threat architecture level, and may include, for example, at least one among detection of a malicious code mail, detection of a malicious code behavior, detection of a virus, detection of ransomware, detection of a malicious URL, detection of a URL in the message body, detection of a URL in an attached file, detection of a social engineering mail, detection of header forgery and alteration, detection of a change in the address of a reply, detection of a change in the ID, detection of a change in the domain, detection of a change in the order of ID and domain, detection of a change in the originating address, detection of a similar domain, detection of a header forgery and alteration warning mail, detection of a spam mail (advertisement or business purpose), and detection of a reliability warning mail.

When any one of these classification conditions is met, a ratio of the number of mails detected for each security threat type to the total number of incoming and outgoing mails may be calculated, and the ratio information may be included in the quantitative analysis information.

For example, the quantitative analysis information on the classification of malicious code threat ratio conditions may be calculated as (the number of malicious codes detected+ the number of malicious URLs detected+the number of ransomwares detected)/(the total number of incoming and outgoing mails)×100%.

In addition, for example, the quantitative analysis information on the classification of social engineering threat ratio condition may be calculated as (the number of header forgery and alterations detected+the number of similar domains detected)/(the total number of incoming and outgoing mails)×100%.

In addition, for example, the quantitative analysis information on the classification of spam mail threat ratio condition may be calculated by the number of spam mails itself.

In addition, for example, the quantitative analysis information on the classification of reliability warning threat ratio condition may be calculated as ratio information of the total number of incoming and outgoing mails compared to the number of mails matched with a reliability lower than 80%.

In addition, for example, the quantitative analysis information on the classification of reliability warning threat ratio condition may be calculated as ratio information of the total number of incoming and outgoing mails compared to the number of mails matched with a reliability lower than 80%.

In addition, for example, the quantitative analysis information on the classification of originating address caution threat ratio condition may be calculated as ratio information of the number of mails in which at least one among the sender's country, server, and route is changed, compared to the total number of incoming and outgoing mails.

Here, the risk factors for each classification conditions may be counted in duplicate, and the number of header forgery and alterations detected and similar domains detected may be simultaneously counted for the same mail.

In addition, the security element-specific threat level determination unit 192 may determine a score of each classified threat level of the mail system to be diagnosed on the basis of the quantitative analysis information.

More specifically, the classification conditions may be assigned for each classified threat level, and the quantitative analysis values detected according to the classification conditions may be summed in correspondence to each classified threat level, and a score of each classified threat level may be determined according to the summed value.

For example, the threat level may be classified into a first level, a second level, a third level, and a fourth level according to the risk, and the quantitative analysis information may be arranged for each level. The ratio values included in the quantitative analysis information are summed, and the security element-specific threat level determination unit 192 may acquire a score of each threat level according to the summed value.

Furthermore, the security element-specific threat level determination unit 192 may set a risk weight corresponding to each threat level. The risk weight may be assigned as such 10% for the first level, 20% for the second level, 30% for the third level, and 40% for the fourth level.

Accordingly, the security element-specific threat level determination unit 192 may calculate the security threat risk of incoming and outgoing emails based on a comprehensive security threat architecture by multiplying the score of each threat level by the risk weight and summing up the results.

The security threat risk of incoming and outgoing emails based on the security threat architecture may be mapped to security levels of A, B, C, D, and E according to preset levels, and according to the mapping, the threat level-based guide contents providing unit 193 may construct threat level-based guide contents that indicate the security threat risk for each domain/period of the comprehensive email security system as a security level, and provide the threat level-based guide contents to the user terminal 200.

Here, the threat level-based guide contents may be configured based on the security element-specific threat level information and the quantitative analysis information of the architecture processing information quantitative analysis unit. The threat level-based guide contents may include an email security diagnosis analysis reporting interface, which includes the number of mails detected in the security threat architecture for each mail type, a diagnosis graph based on detection statistics information, a diagnosis grade, information on the ratio of emails detected for each diagnosis type, measures taken, and the like.

Figure 7:
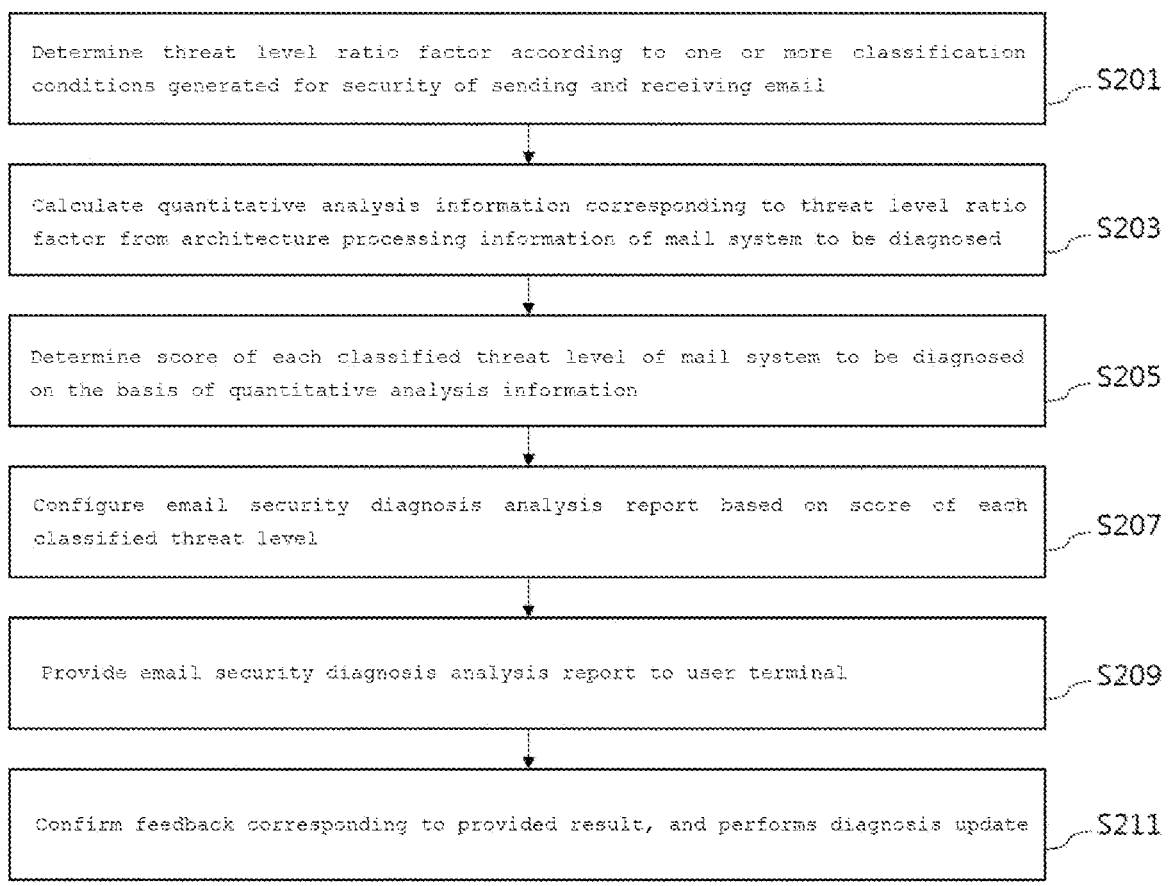
FIG. 7 is a flowchart illustrating the operation of an email security diagnosis service unit according to an embodiment of the present invention.

FIG. 7 is a flowchart illustrating the operation of an email security diagnosis service unit according to an embodiment of the present invention.

Referring to FIG. 7, the email security diagnosis service unit 190 according to an embodiment of the present invention determines one or more threat level ratio factors generated for the sake of security in sending and receiving email (S201).

In addition, the email security diagnosis service unit 190 acquires architecture processing information from the security threat inspection unit 130 in correspondence to the diagnosis domain and diagnosis period of a mail system to be diagnosed, and calculates quantitative analysis information corresponding to the threat level ratio factors from the architecture processing information (S203).

Thereafter, the email security diagnosis service unit 190 determines a score of each classified threat level of the mail system to be diagnosed on the basis of the quantitative analysis information (S205).

Then, the email security diagnosis service unit 190 configures an email security diagnosis analysis report based on the score of each classified threat level (S207).

Thereafter, the email security diagnosis service unit 190 provides the email security diagnosis analysis report to the user terminal 200 (S209), confirms feedback information of the user terminal 200 corresponding to the provided result, and updates diagnosis information of subsequent periods (S211).

FIGS. 8 and 9 are views showing an example of threat level ratio factors and a reference table for calculating a score of each classified threat level according to an embodiment of the present invention.

Referring to FIG. 8, classification conditions for determining threat level ratio factors may be set in advance, and whether or not the classification conditions are met and the number of cases may be calculated from matching result information according to processing of the security threat architecture of the security threat inspection unit 130.

As shown in FIG. 8, the classification conditions may include at least one among detection of behavior, virus, URL in message body, URL in attached file, ransomware, header forgery and alteration, and similar domain.

Here, the malicious code, malicious URL, and ransomware may be classified as malicious code mail, and the header forgery and alteration and similar domain may be classified as social engineering attack mail including targeted email attacks.

More specifically, detection of a behavior may correspond to detection of a malicious code of a pattern not registered in the email or a file installed without user's permission.

In addition, detection of a virus may correspond to detection of a malicious code of a known pattern.

In addition, detection of ransomware may correspond to detection of a malicious program that encrypts data so that the mail may not be used.

In addition, detection of a URL in the message body among malicious URLs may correspond to detection of a malicious code from a URL link in the email message body.

In addition, detection of a URL in an attached file among malicious URLs may correspond to detection of a malicious code from a link in an attached file of an email.

On the other hand, detection of a spam mail may correspond to detection of an advertisement or business mail containing an element that violates preset email rules.

In addition, detection of a reliability warning mail may correspond to detection of an email not sent from the same mail server.

In addition, detection of a change in the address of a reply among the mails having a forged and altered header may correspond to detection of a mail with an email address different from the actual sender's email address in a reply to an email sent with a changed address.

In addition, detection of a change in the ID among the mails having a forged and altered header may correspond to detection of a mail sent by changing the ID part in the actual email address of the sender.

Further, detection of a change in the domain among the mails having a forged and altered header may correspond to detection of a mail sent by changing the domain part in the actual email address of the sender.

In addition, detection of a change in the order of ID and domain among the mails having a forged and altered header may correspond to detection of a mail sent by changing the order of the ID and the domain in the actual email address of the sender.

Meanwhile, although not shown in FIG. 8, detection of a change in the originating address may also be included in the classification conditions. The detection of a change in the originating address may be any one among detection of a change in the sender's country when it is compared to the history of emails sent before the change in the sender's country, detection of a change in the transmitting mail server when it is compared to the history of emails sent before the change in the transmitting mail server, and detection of a change in the delivery route when it is compared to the history of emails sent before the change in the delivery route.

In addition, similar domains may be classified into high, medium, or low according to a degree of change.

When similar domain detection is 'high', it may correspond to detection of a similar email address with three or more characters changed compared to a previously received email address, when the similar domain detection is 'medium', it may correspond to detection of a similar email address with two or more characters changed compared to a previously received email address, and when the similar domain detection is 'low', it may correspond to detection of a similar email address with one or more characters changed compared to a previously received email address.

In addition, when the similar domain detection is a top-level domain (TLD), it may correspond to detection of a similar email address of which the upper domain is changed from a previously received email address.

In addition, as shown in FIG. 9, the quantitative analysis information detected according to each classification condition may be classified for each threat level, and the quantitative analysis information of each level may be summed up and used to calculate a score of each level.

For example, as shown in FIG. 9, a first level (general threat) may include a ratio of reliability warning emails and a ratio of similar domains (low), a second level (general threat) may include a ratio of virus mails, a ratio of emails with URLs in the message body, a ratio of emails with a changed delivery route, a ratio of emails with similar domains (medium), a ratio of emails with a changed ID, and a ratio of emails with a changed domain, a third level (slightly risky) may include a ratio of emails with a changed sender's country, a ratio of emails with a change in the order of ID and domain, a ratio of emails with similar domains (low), and a ratio of emails with a changed addresses in a reply, and a fourth level (highly risky) may include a ratio of emails with a changed transmitting mail server, a ratio of emails with ransomware, a ratio of emails with URLs in attached files, and a ratio of emails with similarity (high) and TLD.

Accordingly, the security element-specific threat level determination unit 192 may set a risk weight corresponding to each threat level, multiply a value obtained by summing the ratio information acquired according to the quantitative analysis for each level by the risk weight, and determine a final security threat score according to the level by adding the values multiplied for each level. Although the weight may be assigned as described above in a manner of 10% for a first level, 20% for a second level, 30% for a third level, and 40% for a fourth level, this may vary according to attributes of each domain or setting of a manager.

Figure 10:
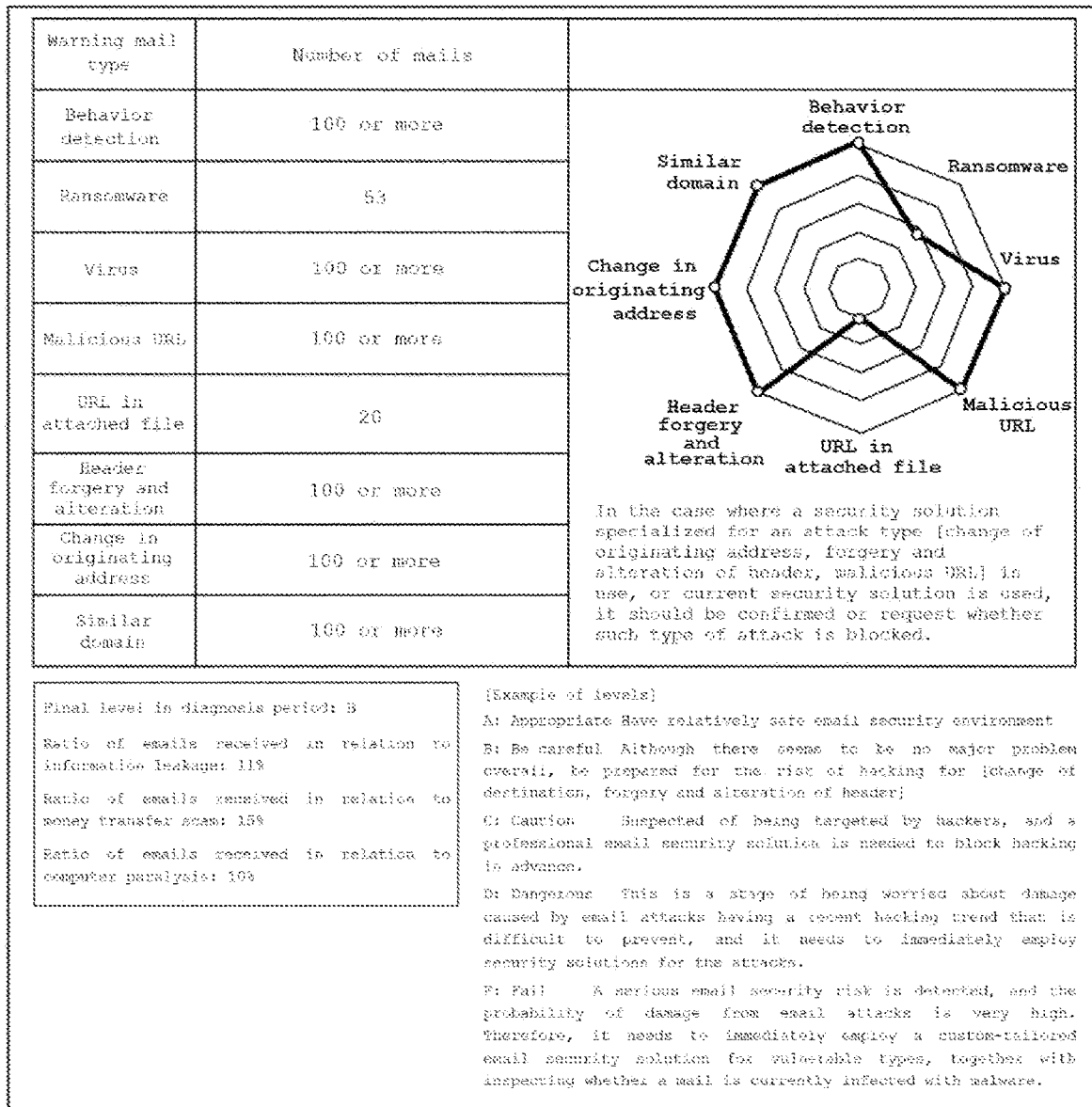
FIGS. 10 to 12 are exemplary views showing a diagnosis reporting interface provided to a user terminal according to an embodiment of the present invention.
Figure 11:
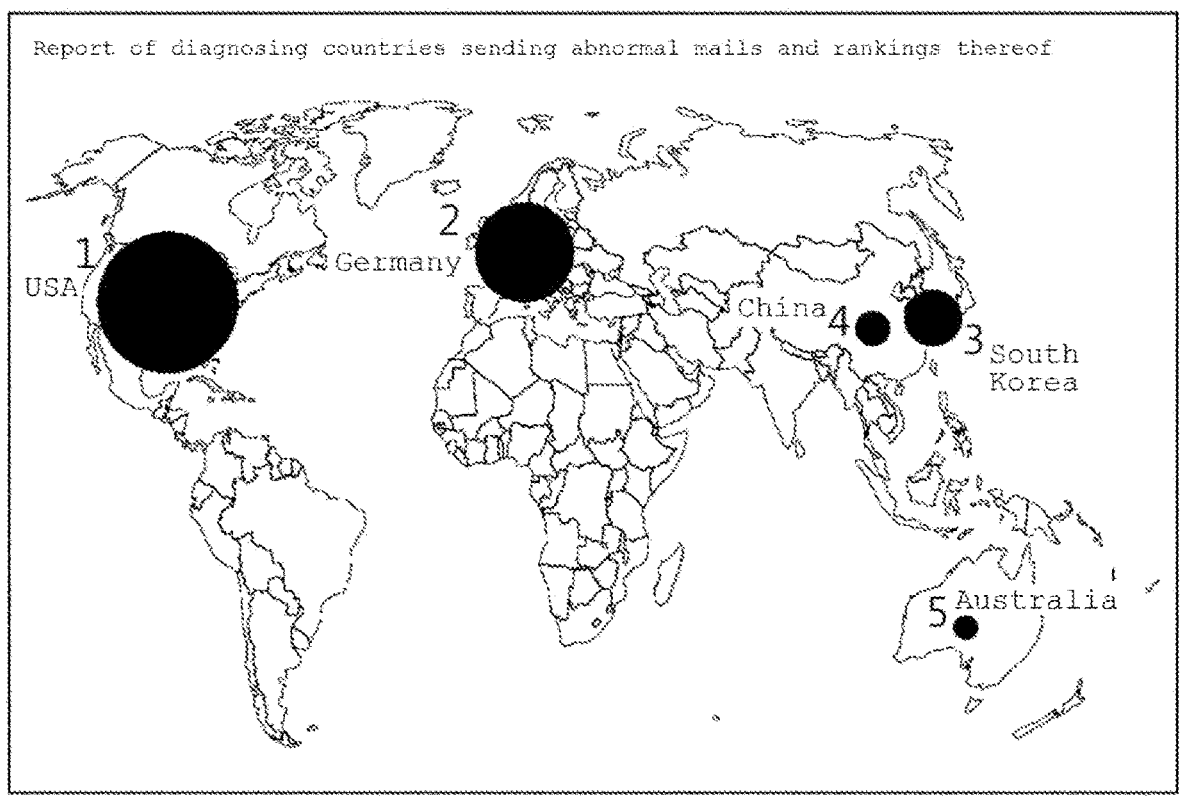
Figure 12:
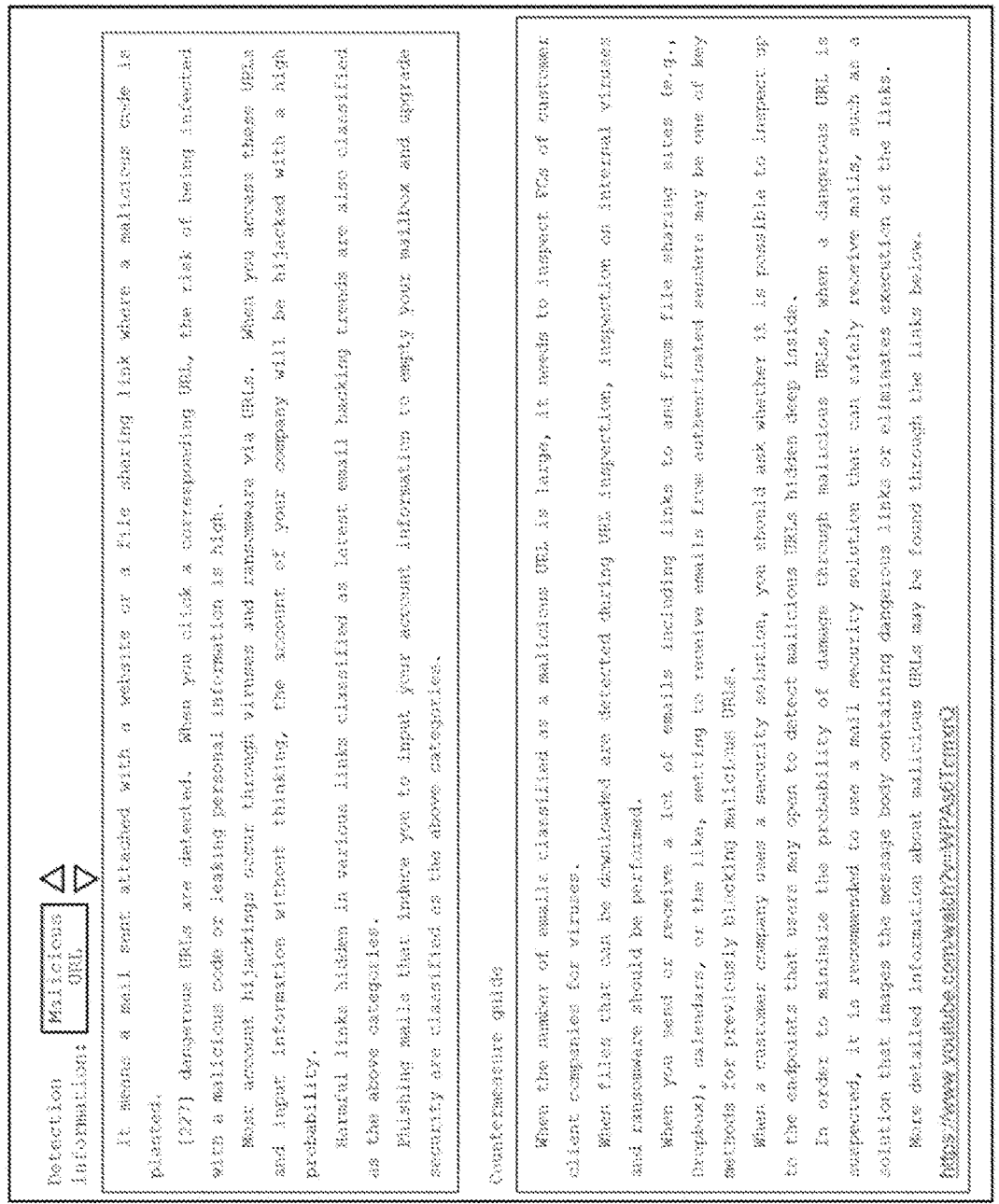

FIGS. 10 to 12 are exemplary views showing a diagnosis reporting interface provided to a user terminal according to an embodiment of the present invention.

Here, the diagnosis reporting interface may be provided by the email security diagnosis service unit 190 to the user terminal 200, and for example, the user terminal 200 may be the user terminal 200 of a security manager of the email system.

As shown in FIG. 10, the diagnosis reporting interface according to an embodiment of the present invention may include a graph interface based on the number of mails detected for each classification condition of each security threat ratio factor (warning mail type) and the number of mails detected for each classification type.

Referring to FIG. 10, the graph interface may include a polygonal interface having vertices of behavior detection, ransomware, virus, malicious URL, URL in attached file, header forgery and alteration, change in originating address, and similar domain, in which the distance of each vertex from the center point to the edge is determined according to a quantitative analysis calculation value corresponding to the classification condition.

A user or an email security manager may visually confirm vulnerable parts in the current system with ease with reference to the polygonal interface.

In addition, the diagnosis reporting interface according to an embodiment of the present invention may provide the user terminal 200 with additional analysis information such as a security level corresponding to a diagnosis period, a ratio of emails received in relation to information leakage, a ratio of emails received in relation to money transfer scam, a ratio of emails received in relation to computer paralysis, and the like, together with the detection information of the interface as described above.

In addition, the diagnosis reporting interface according to an embodiment of the present invention may output guide information based on email security diagnosis that recommends to use a security solution specialized for a vulnerable attack type or proposes to diagnose again.

In addition, referring to FIG. 11, the diagnosis reporting interface according to an embodiment of the present invention may provide a report of diagnosing countries that send abnormal mails and rankings thereof calculated based on the quantitative analysis information for each classification condition. As shown in FIG. 11, as the countries that send abnormal mails and rankings thereof may be displayed as graphic objects, users may easily and intuitively confirm the mail security threat risk of each country.

On the other hand, FIG. 12 shows an interface for providing a countermeasure guide corresponding to detection information, and as shown in FIG. 12, when a specific security threat classification condition is selected, quantitative analysis information corresponding to the selected security threat classification condition is displayed in a digitized form, and detection analysis information based on the quantitative analysis information and countermeasure guide information may be extracted from a previously constructed database and provided to the user terminal 200.

Although the detection information and the countermeasure guide for detection of a malicious URL are displayed In FIG. 12, detection information and countermeasure guides based on quantitative analysis information of various classification conditions, such as behavior detection, header forgery and alteration, change in the originating address, similar domain, spam mail, and the like, may be configured and provided to the user terminal 200.

The methods according to the present invention described above may be manufactured as a program to be executed on a computer and stored in a computer-readable recording medium, and examples of the computer-readable recording medium include ROM, RAM, CD-ROM, magnetic tapes, floppy disks, optical data storage devices and the like.

The computer-readable recording medium may be distributed in computer systems connected through a network, so that computer-readable codes may be stored and executed in a distributed manner. In addition, functional programs, codes, and code segments for implementing the method may be easily inferred by the programmers in the art to which the present invention belongs.

In addition, although preferred embodiments of the present invention have been illustrated and described above, the present invention is not limited to the specific embodiments described above, and various modified embodiments can be made by those skilled in the art without departing from the gist of the invention claimed in the claims, and in addition, these modified embodiments should not be individually understood from the spirit or perspective of the present invention.

The invention claimed is:

1. A service providing device comprising:
    a collection unit for collecting mail information transmitted and received between one or more user terminals;
    a security threat inspection unit for setting a mail security process corresponding to the mail information according to a preset security threat architecture, inspecting the mail information by the mail security process, and storing and managing mail security inspection information according to a result of the inspection;
    an email security diagnosis service unit for calculating quantitative analysis information corresponding to threat level element classification criteria of a mail system to be diagnosed using the mail security inspection information, and configuring and providing an email security diagnosis analysis report based on the quantitative analysis information to a user terminal of a manager; and
    a security element-specific threat level determination unit for assigning the threat level element classification criteria for each classified threat level, and determining a score of each classified threat level using a quantitative analysis value detected according to a classification condition of the threat level element classification criteria,
    wherein the security element-specific threat level determination unit calculates a security threat risk of incoming and outgoing emails based on a comprehensive security threat architecture by multiplying the score of each classified threat level by a risk weight corresponding to each threat level and summing up results of the multiplying.

2. The device according to claim 1, wherein the email security diagnosis service unit includes an architecture processing information quantitative analysis unit for acquiring a diagnosis period and a diagnosis domain in correspondence to the mail system to be diagnosed, and calculating the number of quantitative matches processed in correspondence to the threat level element classification criteria based on each step of the mail security process for the diagnosis period and diagnosis domain.

3. The device according to claim 2, wherein the architecture processing information quantitative analysis unit calculates quantitative analysis information for classifying malicious code threat ratio conditions by comparing a sum of the number of malicious codes detected, the number of malicious URLs detected, and the number of ransomwares detected during the diagnosis period with a total number of incoming and outgoing mails.

4. The device according to claim 2, wherein the architecture processing information quantitative analysis unit calculates quantitative analysis information for classifying social engineering threat ratio conditions by comparing a sum of the number of header forgery and alterations detected and the number of similar domains detected during the diagnosis period with a total number of incoming and outgoing mails.

5. The device according to claim 2, wherein the architecture processing information quantitative analysis unit calculates the number of mails of which reliability is detected to be lower than a predetermined value as the mails are not sent from the same mail server, among mails processed during the diagnosis period, as information on a ratio with respect to a total number of incoming and outgoing mails, and outputs the ratio information as quantitative analysis information for classifying reliability warning threat ratio conditions.

6. The device according to claim 2, wherein the architecture processing information quantitative analysis unit calculates the number of mails of which an originating address is changed, which corresponds to a change in at least one among a sender's country, server, and a path, when compared to history of emails sent before, among mails processed during the diagnosis period, as information on a ratio with respect to a total number of incoming and outgoing mails, and outputs the ratio information as quantitative analysis information for classifying originating address caution threat ratio conditions.

7. The device according to claim 1, wherein the email security diagnosis analysis report includes a polygonal interface having vertices of behavior detection, ransomware, virus, malicious URL, URL in attached file, header forgery and alteration, change in originating address, and similar domain included in the threat level element classification criteria, in which a distance of each vertex from a center point to an edge is determined according to a quantitative analysis calculation value corresponding to the classification condition, and the email security diagnosis analysis report is output on the user terminal of the manager.

8. The device according to claim 1, wherein the email security diagnosis service unit extracts detection analysis information based on the quantitative analysis information and countermeasure guide information from a previously constructed database, and provides the detection analysis information and the countermeasure guide information to the user terminal.

9. An operation method of a service providing device, the method comprising the steps of:
collecting mail information transmitted and received between one or more user terminals;
setting a mail security process corresponding to the mail information according to a preset security threat architecture, inspecting the mail information by the mail security process, and storing and managing mail security inspection information according to a result of the inspection;
calculating quantitative analysis information corresponding to threat level element classification criteria of a mail system to be diagnosed using the mail security inspection information, and configuring and providing an email security diagnosis analysis report based on the quantitative analysis information to a user terminal of a manager;
assigning the threat level element classification criteria for each classified threat level; and
determining a score of each classified threat level using a quantitative analysis value detected according to a classification condition of the threat level element classification criteria,
wherein the determining step includes the step of calculating a security threat risk of incoming and outgoing emails based on a comprehensive security threat architecture by multiplying the score of each classified threat level by a risk weight corresponding to each threat level and summing up results of the multiplying.

10. The method according to claim 9, wherein the providing step includes the step of acquiring a diagnosis period and a diagnosis domain in correspondence to the mail system to be diagnosed, and calculating the number of quantitative matches processed in correspondence to the threat level element classification criteria based on each step of the mail security process for the diagnosis period and diagnosis domain.

11. The method according to claim 10, wherein the calculating step includes the step of calculating quantitative analysis information for classifying malicious code threat ratio conditions by comparing a sum of the number of malicious codes detected, the number of malicious URLs detected, and the number of ransomwares detected during the diagnosis period with a total number of incoming and outgoing mails.

12. The method according to claim 10, wherein the calculating step includes the step of calculating quantitative analysis information for classifying social engineering threat ratio conditions by comparing a sum of the number of header forgery and alterations detected and the number of similar domains detected during the diagnosis period with a total number of incoming and outgoing mails.

13. The method according to claim 10, wherein the calculating step includes the step of calculating the number of mails of which reliability is detected to be lower than a predetermined value as the mails are not sent from the same mail server, among mails processed during the diagnosis period, as information on a ratio with respect to a total number of incoming and outgoing mails, and outputs the ratio information as quantitative analysis information for classifying reliability warning threat ratio conditions.

14. The method according to claim 10, wherein the calculating step includes the step of calculating the number of mails of which an originating address is changed, which corresponds to a change in at least one among a sender's country, server, and a path, when compared to history of emails sent before, among mails processed during the diagnosis period, as information on a ratio with respect to a total number of incoming and outgoing mails, and outputs the ratio information as quantitative analysis information for classifying originating address caution threat ratio conditions.

15. The method according to claim 9, wherein the email security diagnosis analysis report includes a polygonal interface having vertices of behavior detection, ransomware, virus, malicious URL, URL in attached file, header forgery and alteration, change in originating address, and similar domain included in the threat level element classification criteria, in which a distance of each vertex from a center point to an edge is determined according to a quantitative analysis calculation value corresponding to the classification condition, and the email security diagnosis analysis report is output on the user terminal of the manager.

16. The method according to claim 9, further comprising the step of extracting detection analysis information based on the quantitative analysis information and countermeasure guide information from a previously constructed database, and providing the detection analysis information and the countermeasure guide information to the user terminal.

* * * * *